United States Patent
Kim et al.

(10) Patent No.: US 9,274,507 B2
(45) Date of Patent: Mar. 1, 2016

(54) SMART WATCH AND CONTROL METHOD THEREOF

(71) Applicant: LG ELECTRONICS INC., Seoul (KR)

(72) Inventors: Jihwan Kim, Seoul (KR); Jongho Kim, Seoul (KR); Doyoung Lee, Seoul (KR); Yongsin Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 14/167,107

(22) Filed: Jan. 29, 2014

(65) Prior Publication Data

US 2015/0160622 A1  Jun. 11, 2015

(30) Foreign Application Priority Data

Dec. 6, 2013  (KR) ........................ 10-2013-0151583

(51) Int. Cl.
| | |
|---|---|
| *G04G 21/02* | (2010.01) |
| *G04G 9/00* | (2006.01) |
| *G01P 13/00* | (2006.01) |
| *G04G 21/04* | (2013.01) |
| *G06F 1/16* | (2006.01) |

(52) U.S. Cl.
CPC ................ *G04G 21/02* (2013.01); *G01P 13/00* (2013.01); *G04G 9/0005* (2013.01); *G04G 9/0064* (2013.01); *G04G 21/04* (2013.01); *G06F 1/163* (2013.01)

(58) Field of Classification Search
CPC ...................................................... G06F 1/163
See application file for complete search history.

(56) References Cited

U.S. PATENT DOCUMENTS

| | | | |
|---|---|---|---|
| 8,098,141 B2 | 1/2012 | Vanska et al. | |
| 8,112,281 B2 | 2/2012 | Yeung et al. | |
| 8,896,526 B1 * | 11/2014 | Park .............................. | 345/156 |
| 2005/0276164 A1 | 12/2005 | Amron | |
| 2009/0059730 A1 * | 3/2009 | Lyons et al. .................... | 368/69 |
| 2010/0066664 A1 | 3/2010 | Son et al. | |
| 2010/0112964 A1 | 5/2010 | Yi et al. | |
| 2011/0022196 A1 | 1/2011 | Linsky et al. | |
| 2012/0082013 A1 | 4/2012 | Yeung et al. | |
| 2015/0092520 A1 * | 4/2015 | Robison et al. ................... | 368/9 |

* cited by examiner

*Primary Examiner* — Gerald Johnson
(74) *Attorney, Agent, or Firm* — Birch, Stewart, Kolasch & Birch, LLP

(57) ABSTRACT

A smart watch and a control method thereof are disclosed. The smart watch includes a first sensor unit configured to detect whether the smart watch is worn, a display unit configured to display visual information, a second sensor unit configured to detect movement of the smart watch, and a processor configured to control the first sensor unit, the display unit, and the second sensor unit. If first movement of the smart watch is detected on an arm of a user while the smart watch is being worn, the processor obtains direction and distance of the first movement of the smart watch. If the direction of the first movement is a first direction and the distance of the first movement is equal to or more than a first threshold distance, the processor performs a first function corresponding to the first direction.

19 Claims, 29 Drawing Sheets

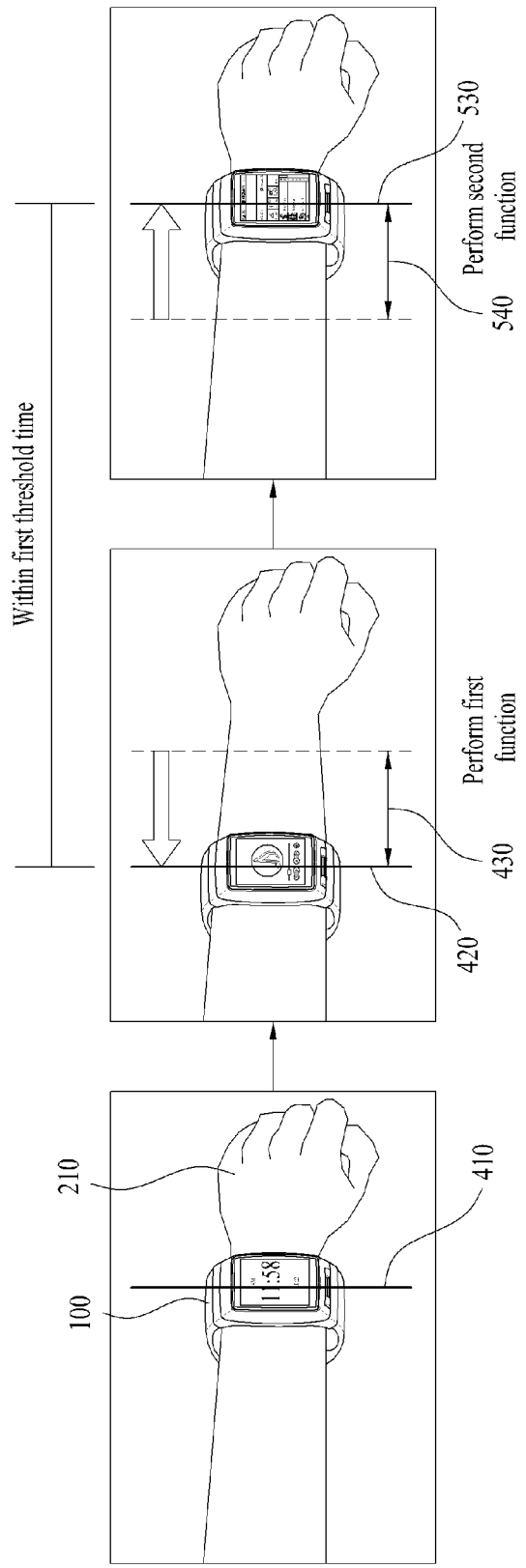

Perform second function

810 — Execute bookmarks using movement of finger

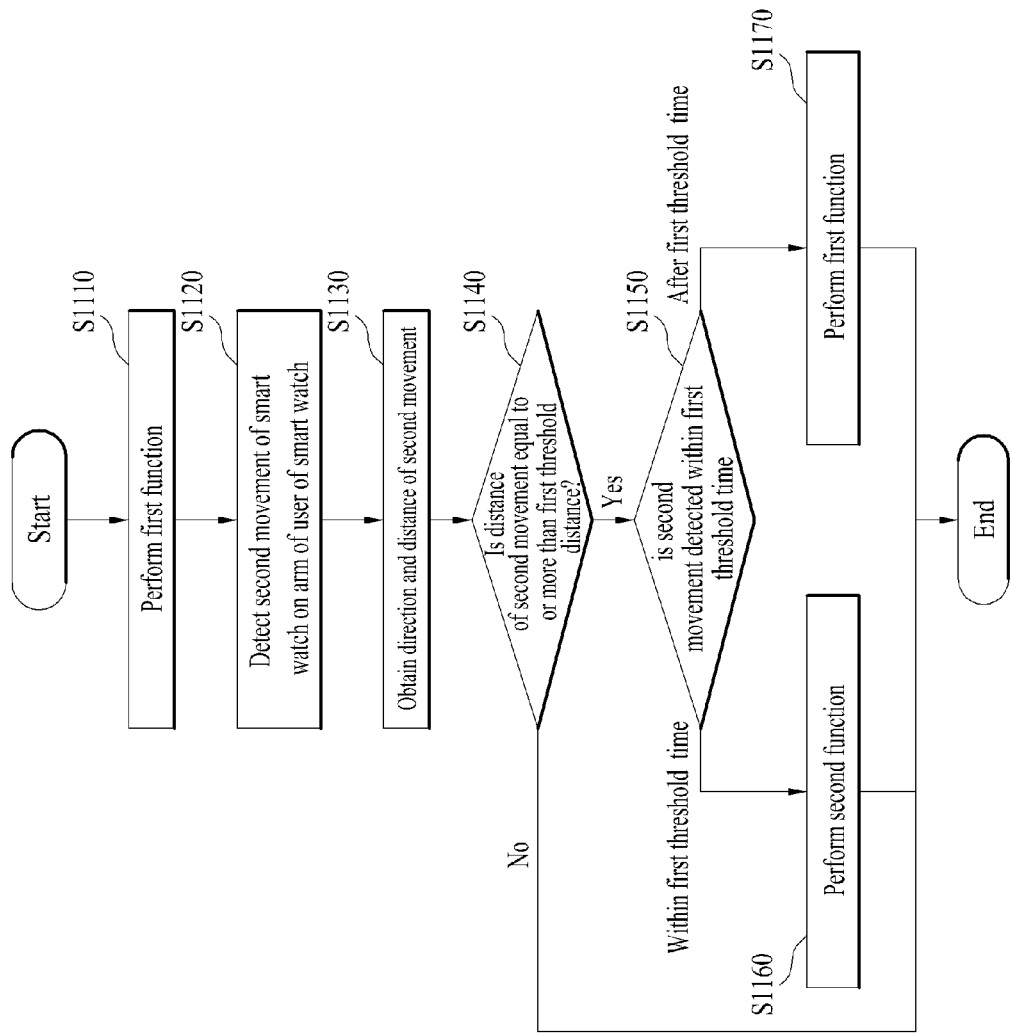

SMART WATCH AND CONTROL METHOD THEREOF

This application claims the benefit of Korean Patent Application No. 10-2013-0151583, filed on Dec. 6, 2013, which is hereby incorporated by reference as if fully set forth herein.

BACKGROUND OF THE INVENTION

1. Field of the Invention

The disclosure relates to a smart watch and a control method thereof and, more particularly, to a smart watch for performing a function based on whether the smart watch is worn by a user and on the direction and distance of movement of the smart watch on an arm of the user who wears the smart watch.

2. Discussion of the Related Art

Development of wearable computers is accelerating with advances in technology. Wearable computers refer to computers that a user may naturally wear like clothes, watches, glasses, and accessories. Smartphones or tablet PCs may be easily manipulated with fingers or a touch pen but may be inconvenient because they should be carried in a pocket or bag or be held in the hand. On the other hand, wearable computers may achieve better portability than smartphones or tablet PCs because they can be worn around the wrist or worn like glasses. Specifically, as an example of a wearable computer, a wristwatch-type mobile device, i.e., a smart watch, capable of wirelessly using various services such as a diary, messages, notifications, and stock quotations has appeared in the form of a variety of products.

A smart watch may have a small display area and have restrictions in input indicating to perform a function. Therefore, technology of detecting input indicating to perform a function of a smart watch is required.

SUMMARY OF THE INVENTION

Accordingly, the disclosure is directed to a smart watch and a control method thereof that substantially obviate one or more problems due to limitations and disadvantages of the related art.

An object of the disclosure is to provide a smart watch for performing a function based on the direction and distance of movement of the smart watch detected on an arm of a user who wears the smart watch.

Another object of the disclosure is to provide a smart watch for performing different functions based on a time when additional movement of the smart watch is detected after the smart watch performs a function.

A further object of the disclosure is to provide a smart watch for performing only a function intended by a user by performing the function only if additional contact is detected on a front surface of the smart watch.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a smart watch includes a first sensor unit configured to detect whether the smart watch is worn, a display unit configured to display visual information, a second sensor unit configured to detect movement of the smart watch, and a processor configured to control the first sensor unit, the display unit, and the second sensor unit, wherein the processor is further configured to, if a first movement of the smart watch is detected on an arm of a user while the smart watch is being worn, obtain a direction and a distance of the first movement of the smart watch, and wherein, if the direction of the first movement is a first direction and the distance of the first movement is equal to or more than a first threshold distance, the processor perform a first function corresponding to the first direction.

In another aspect of the disclosure, a control method of a smart watch includes detecting whether the smart watch is worn, and detecting a movement of the smart watch, wherein the detecting of the movement of the smart watch includes, if a first movement of the smart watch is detected on an arm of a user while the smart watch is being worn, obtaining direction and distance of the first movement of the smart watch, and, if the direction of the first movement is a first direction and the distance of the first movement is equal to or more than a first threshold distance, performing a first function corresponding to the first direction.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 5A to 5E are views illustrating a method of performing a function based on additional movement of the smart watch, according to an embodiment of the disclosure;

FIG. 11 is a flowchart of a control method of the smart watch, according to another embodiment of the disclosure.

DETAILED DESCRIPTION OF THE INVENTION

Although the terms used in the following description are selected, as much as possible, from general terms that are widely used at present while taking into consideration the functions obtained in accordance with the embodiments, these terms may be replaced by other terms based on intentions of those skilled in the art, customs, emergence of new technologies, or the like. In addition, in a particular case, terms that are arbitrarily selected by the applicant may be used. In this case, the meanings of these terms may be described in corresponding parts of the disclosure. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

The disclosure relates to a smart watch. The smart watch refers to a wearable device worn and carried by a user. According to an embodiment, the smart watch may be worn around a wrist of the user like a wristwatch. Alternatively, if necessary, the smart watch may be worn around any other part of the body. The smart watch will now be described.

Figure 1:
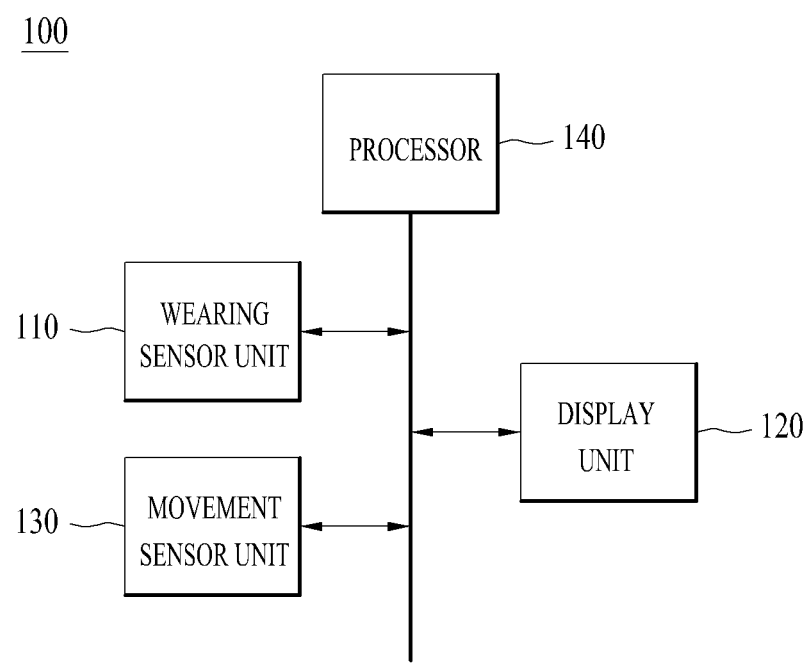
FIG. 1 is a block diagram of a smart watch according to an embodiment of the disclosure.

FIG. 1 is a block diagram of a smart watch 100 according to an embodiment of the disclosure.

In the embodiment of FIG. 1, the smart watch 100 may include a wearing sensor unit 110, a display unit 120, a movement sensor unit 130, and a processor 140.

According to the disclosure, the smart watch 100 may detect whether the smart watch 100 is worn using the wearing sensor unit 110. For example, the smart watch 100 may detect whether the smart watch 100 is worn using a proximity sensor. Alternatively, the smart watch 100 may detect whether the smart watch 100 is worn using a sensor included in a buckle 150 (see FIG. 2) of the smart watch 100. Specifically, if the smart watch 100 is buckled, the smart watch 100 may determine that the smart watch 100 is worn by a user. Alternatively, the smart watch 100 may detect whether the smart watch 100 is worn using a touch sensor included in a rear surface of a main body 170 or a band 160 (see FIG. 2) of the smart watch 100. Specifically, if the smart watch 100 senses touch of the user on the rear surface of the main body 170 or the band 160, the smart watch 100 may determine that the smart watch 100 is worn by the user. That is, the smart watch 100 may determine whether the smart watch 100 is worn by the user using the above-described sensors. In the disclosure, at least one of the above sensors for providing sensing results to be referred for determination is referred to as the wearing sensor unit 110.

According to the disclosure, the smart watch 100 may detect movement of the smart watch 100 using the movement sensor unit 130. For example, the smart watch 100 may detect movement of the smart watch 100 using a proximity sensor. Alternatively, the smart watch 100 may detect movement of the smart watch 100 using a touch sensor included in a rear surface of the main body 170 or the band 160.

In addition, the smart watch 100 may include at least one of a gyro sensor, an acceleration sensor, and a gravity sensor. As such, the smart watch 100 may detect movement by detecting the position of the smart watch 100 on an arm 210 (see FIG. 3) of the user.

According to an embodiment, the smart watch 100 may detect movement by detecting a position where the smart watch 100 is worn and then measuring a time when a signal varies as the smart watch 100 moves. Alternatively, the smart watch 100 may detect movement of the smart watch 100 based on variation in coordinates of the smart watch 100 detected on the arm 210. That is, the smart watch 100 may detect movement of the smart watch 100 on the arm 210 using the above-described sensors. In the disclosure, at least one of the above sensors for providing sensing results to be referred for determination is referred to as the movement sensor unit 130.

The above-described sensors included in the smart watch 100 may be formed as separate elements or at least one integrated element. According to an embodiment, the wearing sensor unit 110 and the movement sensor unit 130 may be an integrated sensor unit. The integrated sensor unit may simultaneously detect whether the smart watch 100 is worn and movement of the smart watch 100, and may transmit a signal regarding the detected results to the processor 140.

The display unit 120 may display visual information. In this case, the visual information may include at least one of a still image, a moving image, and text and may refer to information visually recognizable by the user. In addition, the visual information may be a result of execution of various types of digital content by the smart watch 100.

According to the disclosure, the display unit 120 may display information regarding a function performed by the processor 140 or feedback information regarding the performed function as the visual information.

The processor 140 may perform a function based on signals received from the wearing sensor unit 110 and the movement sensor unit 130. When the smart watch 100 is worn by the user, the processor 140 may detect movement of the smart watch 100 on the arm 210 to obtain the direction and distance of movement. In addition, the processor 140 may perform a function by determining whether the obtained direction and distance of movement of the smart watch 100 correspond to a predetermined direction and distance of movement.

Here, the performed function may include a function related to capture of a screen image and storing of the captured image, a function related to control of an external device, a function related to payment, a function related to link connection to or link disconnection from a portable device, a function related to execution of a search mode, a function related to bookmarking, a function related to display of visual information, a function related to switching on or off of a setup value, a function related to returning to a previous operation, a function related to separation of user interface structures, and a function related to reception of a call signal. However, functions performed by the smart watch 100 are not limited to the above-listed functions. The functions of the smart watch 100 will be described in detail below with reference to FIG. 4A.

In addition, the processor 140 may determine whether to operate each unit of the smart watch 100. Specifically, the processor 140 may set an on or off state of each unit. According to an embodiment, in order to prevent the smart watch 100 from performing unintended functions, the processor 140 may set the wearing sensor unit 110 or the movement sensor unit 130 not to detect input. As such, the smart watch 100 may perform a function only as desired by the user.

The blocks illustrated in FIG. 1 indicate logically separate elements of the smart watch 100, according to an embodiment of the disclosure. Therefore, the elements may be mounted in the form of one integrated chip or a plurality of separate chips based on design of the smart watch 100.

Figure 2:
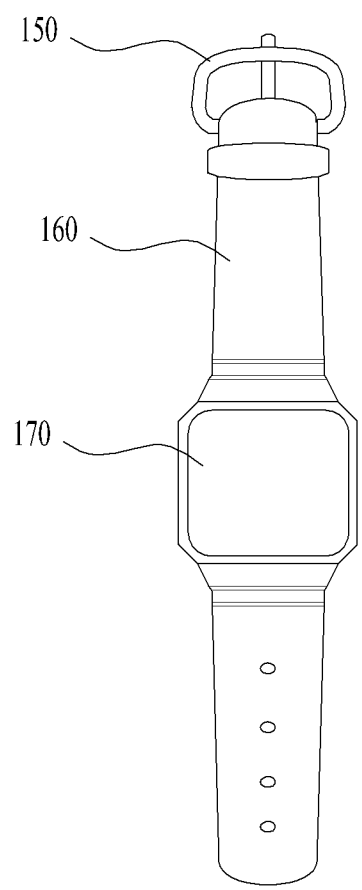
FIG. 2 is a rear view of the smart watch, according to an embodiment of the disclosure.

FIG. 2 is a rear view of the smart watch 100, according to an embodiment of the disclosure.

Although not shown in FIG. 1, the smart watch 100 may include a rotation sensor unit (not shown) for detecting rotation of the smart watch 100 about a rotation axis thereof. The smart watch 100 may also include a front-surface touch sensor unit (not shown) for sensing additional touch on a front surface of the main body 170 or the band 160. The smart watch 100 may further include a tightness sensor unit (not shown) for detecting how tightly the band 160 is fastened. In addition, the smart watch 100 may include a storage unit (not shown) for storing digital data.

The rotation sensor unit may include at least one of a gyro sensor, an acceleration sensor, and a gravity sensor. The rotation sensor unit may detect rotation of the smart watch 100 about a rotation axis thereof. In this case, the smart watch 100 may obtain the direction and distance of rotation. The processor 140 may perform a function by determining whether the direction and distance of rotation correspond to a predetermined direction and distance of rotation. A description thereof will be provided below with reference to FIG. 5E.

The front-surface touch sensor unit may be formed in the front surface of the main body 170 or the band 160 of the smart watch 100. The front-surface touch sensor unit may detect an additional input signal. In this case, the additional input signal may be different from an input signal sensed by the wearing sensor unit 110 and the movement sensor unit 130. Specifically, the front-surface touch sensor unit may detect additional touch input of the user on the front surface of the main body 170 or the band 160. A detailed description thereof will be provided below with reference to FIG. 6.

The storage unit may store a variety of digital data such as video, audio, image, and application. According to the disclosure, the processor 140 may store an image captured by performing a function, or history information regarding performed functions, in the storage unit. According to an embodiment, the smart watch 100 may store programs used for control by the processor 140, or may temporarily store input/output data. The storage unit may include a variety of digital data storage devices such as flash memory, random access memory (RAM), and a solid state drive (SSD).

The tightness sensor unit may detect how tightly the band 160 of the smart watch 100 is fastened. Here, the tightness sensor unit may include at least one of a pressure sensor, a proximity sensor, and an infrared sensor. In this case, the processor 140 may adjust a threshold distance corresponding to a reference value regarding the distance of movement of the smart watch 100, based on the detected tightness. A description thereof will be provided below with reference to FIG. 3.

The above-described sensors included in the smart watch 100 may be formed as separate elements or at least one integrated element.

Figure 3:
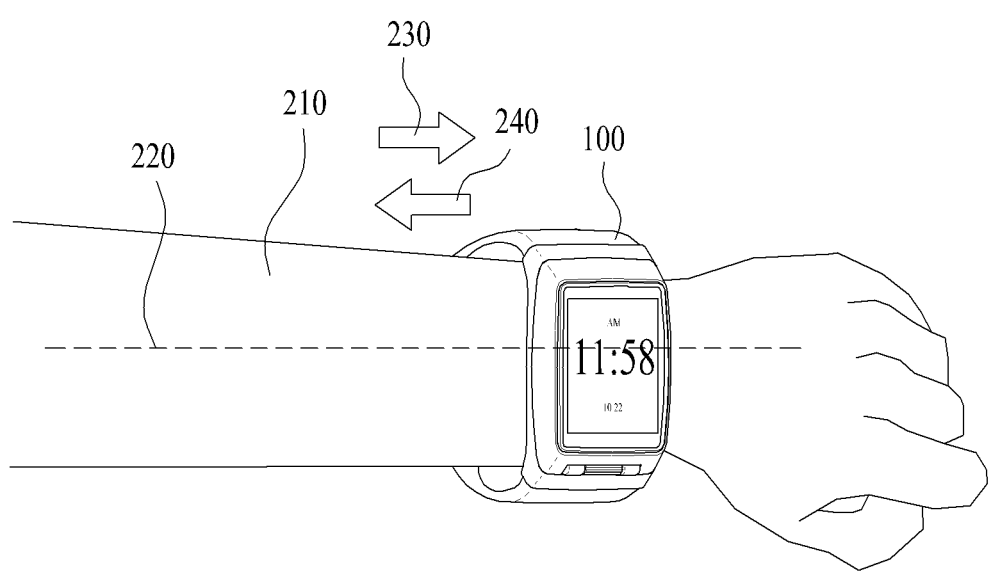
FIG. 3 is a view illustrating the smart watch worn by a user, according to an embodiment of the disclosure.

FIG. 3 is a view illustrating the smart watch 100 worn by a user, according to an embodiment of the disclosure. Specifically, FIG. 3 shows movement of the smart watch 100 on the arm 210 of the user.

According to the disclosure, the smart watch 100 may move on the arm 210 of the user. In this case, the distance of movement may vary based on how tightly the band 160 is fastened. When the smart watch 100 is worn by the user, the smart watch 100 may be fastened sufficiently loosely to move on the arm 210. In this case, according to an embodiment, the user may adjust tightness of the band 160. Here, as described above, the processor 140 of the smart watch 100 may change a threshold distance based on tightness. The band 160 may be formed of a flexible or bendable material to achieve smooth movement of the smart watch 100.

When the smart watch 100 is worn by the user, the smart watch 100 may move on the arm 210 of the user in a direction parallel to an axis 220 of the arm 210. In this case, the direction parallel to the axis 220 of the arm 210 may be an outward direction 230 or an inward direction 240. Specifically, the outward direction 230 may be a direction toward fingertips of the user on the arm 210. The inward direction 240 may be a direction toward the shoulder of the user on the arm 210.

As movement of the smart watch 100 on the arm 210 is detected along the axis 220 of the arm 210, the processor 140 may obtain the direction and distance of movement and perform a corresponding function.

Figure 4A:
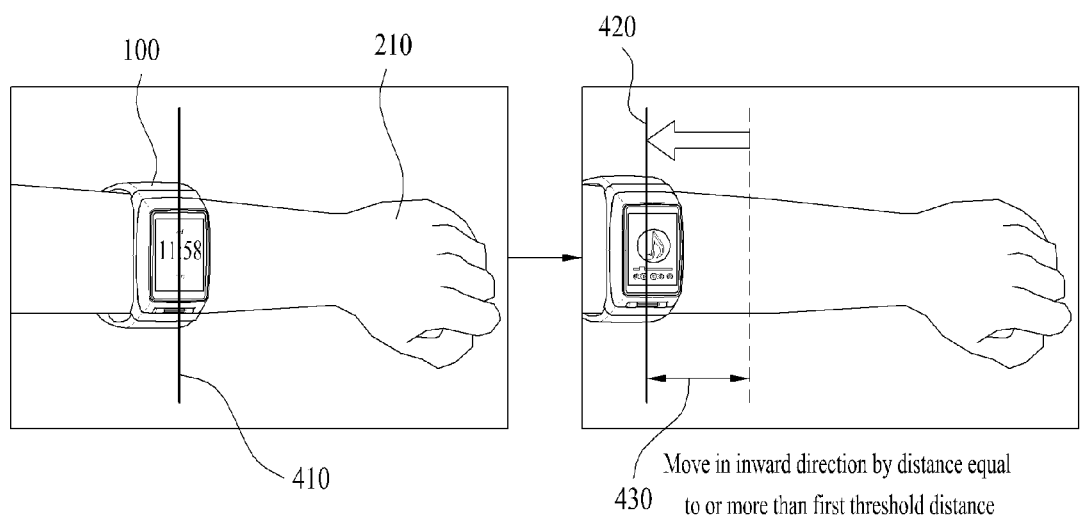
FIGS. 4A and 4B are views illustrating a method of performing a function based on the direction of movement of the smart watch, according to an embodiment of the disclosure.
Figure 4B:
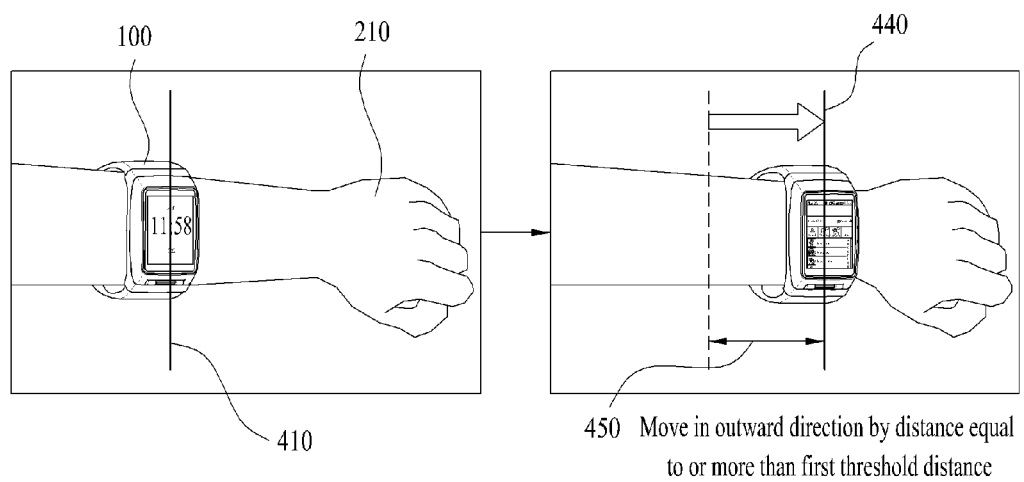

FIGS. 4A and 4B are views illustrating a method of performing a function based on the direction of movement of the smart watch 100, according to an embodiment of the disclosure.

The processor 140 according to the disclosure may detect movement of the smart watch 100 and obtain the direction and distance of movement. In this case, the processor 140 may determine whether the direction of movement is a predetermined direction and the distance of movement is equal to or more than a predetermined distance. In detail, the processor 140 may perform a first function if the direction of movement is a first direction and the distance of movement is equal to or more than a threshold distance. In this case, the threshold distance refers to a distance referred to determine whether the smart watch 100 performs a function based on movement. That is, if movement is detected and the distance of movement is less than the threshold distance, the smart watch 100 does not perform a function. In this case, the processor 140 may differently set the threshold distance. In addition, the processor 140 may change the threshold distance by detecting tightness of the band 160 as described above. Specifically, if the detected tightness is tight, the processor 140 may reduce the threshold distance. Otherwise, if the detected tightness is loose, the processor 140 may increase the threshold distance. Alternatively, the processor 140 may set the threshold distance to have a certain error range. Alternatively, considering that the thickness of the arm 210 increases in the inward direction 240, the processor 140 may set a threshold distance in the case of movement in the inward direction 240 differently from a threshold distance in the case of movement in the outward direction 230.

According to the disclosure, the first direction is a direction parallel to the axis 220 of the arm 210, and may be the outward direction 230 or the inward direction 240, as described above. In this case, the processor 140 may set a function to be performed in the case that the first direction is the outward direction 230 and a function to be performed in the case that the first direction is the inward direction 240, as the same function or different functions.

Referring to FIG. 4A, the processor 140 may determine whether to perform a function based on the direction and distance of movement of the smart watch 100. If the processor 140 detects that the smart watch 100 moves on the arm 210 along the axis 220 of the arm 210 in the inward direction 240 by a distance equal to or more than the threshold distance, the processor 140 may perform a function. Specifically, the processor 140 may detect movement of the smart watch 100 from a first central axis 410 to a second central axis 420. In this case, the first central axis 410 refers to an axis that passes through the center of the main body 170 of the smart watch 100 before the smart watch 100 moves, and the second central axis 420 refers to an axis that passes through the center of the main body 170 of the smart watch 100 after the smart watch 100 moves in the inward direction 240. The distance between the first central axis 410 and the second central axis 420 may correspond to a distance 430 of movement of the smart watch 100. Since the second central axis 420 is positioned at an inner side of the arm 210 compared to the first central axis 410, the processor 140 may detect that the smart watch 100 has moved in the inward direction 240. In this case, if the distance 430 of movement is equal to or more than the threshold distance, the processor 140 may perform a function corresponding to the inward direction 240.

Referring to FIG. 4B, the processor 140 determined whether to perform a function based on the direction and distance of movement of the smart watch 100. If the processor 140 detects that the smart watch 100 moves on the arm 210 along the axis 220 of the arm 210 in the outward direction 230 by a distance equal to or more than the threshold distance, the processor 140 may perform a function. Specifically, the processor 140 may detect movement of the smart watch 100 from the first central axis 410 to a second central axis 440. In this case, the first central axis 410 refers to an axis that passes through the center of the main body 170 of the smart watch 100 before the smart watch 100 moves, and the second central axis 440 refers to an axis that passes through the center of the main body 170 of the smart watch 100 after the smart watch 100 moves in the outward direction 230. The distance between the first central axis 410 and the second central axis 440 corresponds to a distance 450 of movement of the smart watch 100. Since the second central axis 440 is positioned at an outer side of the arm 210 compared to the first central axis 410, the processor 140 may detect that the smart watch 100 has moved in the outward direction 230. In this case, if the distance 450 of movement is equal to or more than the threshold distance, the processor 140 may perform a function corresponding to the outward direction 230.

In this case, as described above, for example, the processor 140 may set a function corresponding to the inward direction 240 and a function corresponding to the outward direction 230, as the same function or different functions. In addition, for example, the above-described function may be a function related to visual information displayed on or audio information output from the smart watch 100.

Alternatively, the processor 140 may differently set the threshold distance of the smart watch 100 and the first direction based on the height, direction, and position of the arm 210. Correspondingly, functions to be performed may also be differently set.

According to an embodiment, if the arm 210 on which the smart watch 100 is worn is directed to the ground surface, the smart watch 100 may be positioned at the outermost side on the arm 210. That is, the smart watch 100 may be positioned close to the wrist. In this case, the processor 140 may reduce the threshold distance. That is, since the smart watch 100 is positioned at the outermost side, the threshold distance may be changed correspondingly. In addition, the processor 140 may perform a function corresponding to the direction and position of the arm 210 directed to the ground surface.

Specifically, when the smart watch 100 received a call signal, the arm 210 of the user may be directed to the ground surface and be stretched. After that, the processor 140 may detect that the user moves the smart watch 100 in the inward direction 240 of the arm by a distance equal to or more than the threshold distance. In this case, the processor 140 may perform a function of rejecting the call signal in consideration of the height, direction, and position of the arm 210 of the user. Alternatively, if the user directs the arm 210 to be perpendicular to the ground surface and to be positioned near the mouth, the processor 140 may detect that the user moves the smart watch 100 on the arm 210 by a distance equal to or more than the threshold distance. In this case, the processor 140 may perform a function of starting a call based on the call signal.

According to another embodiment, if the arm 210 on which the smart watch 100 is worn is directed opposite to the ground surface, the smart watch 100 may be positioned at the innermost side on the arm 210. That is, the smart watch 100 may be positioned the most far away from the wrist. In this case, when a signal regarding movement of the smart watch 100 is received, the processor 140 may differently set the threshold distance regarding the distance of movement. In addition, the processor 140 may perform a function corresponding to the height, direction, and position of the arm 210.

FIGS. 5A to 5E are views illustrating a method of performing a function based on additional movement of the smart watch 100, according to an embodiment of the disclosure.

According to the disclosure, as illustrated in FIG. 4A or 4B, the smart watch 100 may perform a function when movement corresponding to a distance equal to or more than a threshold distance is detected. After that, when additional movement of the smart watch 100 detected, the smart watch 100 may perform an additional function. A method thereof will now be described. In this case, a function primarily performed by the smart watch 100 is referred to as a first function, and a function secondarily performed by the smart watch 100 is referred to as a second function. In addition, movement detected by the processor 140 to perform the first function is referred to as first movement, and movement detected by the processor 140 to perform the second function is referred to as second movement.

According to the disclosure, when the smart watch 100 detects sequential movements, the smart watch 100 may perform a plurality of functions. Specifically, when the first movement is detected, if the distance of the first movement is equal to or more than the threshold distance, the processor 140 may perform the first function. After that, the processor 140 may detect the second movement and obtain the distance and direction of the second movement. In this case, the processor 140 may determine that the distance of the second movement is equal to or more than the threshold distance. This is because, as described above, when movement of the smart watch 100 corresponding to a distance less than the threshold distance is detected, the processor 140 does not recognize the movement of the smart watch 100 as input for performing a function.

If the processor 140 detects that the distance of the second movement is equal to or more than the threshold distance, the processor 140 may determine whether the second movement is detected within a first threshold time. In this case, the first threshold time may be a threshold time for determining the second movement. Specifically, if the processor 140 detects that the smart watch 100 moves within the first threshold time from when the smart watch 100 performs the first function, the processor 140 may detect this movement as the second movement. In this case, the processor 140 may perform the second function related to the first function.

Otherwise, if the processor 140 detects that the smart watch 100 moves after the first threshold time from when the smart watch 100 performs the first function, the processor 140 may detect this movement as new first movement regardless of the first function. In this case, the processor 140 may perform a new first function.

In addition, if the processor 140 detects that the distance of the second movement is equal to or more than the threshold distance, the processor 140 may determine whether the second movement is detected within a second threshold time.

In this case, the second threshold time may be shorter than the first threshold time. The second threshold time may be a threshold time for determining the first movement and the second movement as integrated movement. Specifically, if the processor 140 detects the second movement within the second threshold time from when the first movement is detected, the processor 140 may perform the first function after the first movement and the second movement are completely detected. That is, the processor 140 may perform the first function after the second movement is detected, not when the first movement is detected.

In this case, according to an embodiment, if the first threshold time is applied, the processor 140 may operate in a first mode. Alternatively, if the second threshold time is applied, the processor 140 may operate in a second mode. Otherwise, the processor 140 may operate in a third mode for applying both the first threshold time and the second threshold time.

Specifically, when the processor 140 operates in the first mode, if the first movement corresponding to a distance equal to or more than the threshold distance is detected, the processor 140 may immediately perform the first function. In this case, if the second movement corresponding to a distance equal to or more than the threshold distance is detected, the processor 140 may determine whether the second movement is detected within the first threshold time. If the second movement is detected within the first threshold time, the processor 140 may perform the second function. Otherwise, if the second movement is detected after the first threshold time, the processor 140 may perform a new first function. That is, the first threshold time may be a threshold time to determine whether to perform the second function. If the processor 140 operates in the first mode, the second threshold time may not be considered.

When the processor 140 operates in the second mode, if the first movement corresponding to a distance equal to or more than the threshold distance is detected, the processor 140 may not perform the first function. In this case, if the second movement is detected within the second threshold time, the processor 140 may perform the first function after the second movement is detected. Otherwise, if the second movement is not detected within the second threshold time, the processor 140 may not perform function. That is, only when the second movement is detected within the second threshold time from when the first movement is detected, the processor 140 may perform the first function. If the processor 140 operates in the second mode, the first threshold time may not be considered.

Alternatively, for example, the processor 140 may operate in the third mode for applying both the first threshold time and the second threshold time.

If the processor 140 operates in the third mode, the processor 140 may initially determine whether the second movement is detected within the second threshold time. Specifically, if the processor 140 detects the second movement within the second threshold time from when the first movement is detected, the processor 140 may perform the first function after the first movement and the second movement are completely detected.

Otherwise, the processor 140 may perform the first function after the second threshold time from when the first movement is detected. In this case, if the processor 140 detects the second movement within a time longer than the second threshold time and shorter than the first threshold time, the processor 140 may perform the second function related to the first function.

The processor 140 may set each of the above-described first threshold time and the second threshold time to have a certain error range.

As described above, the smart watch 100 may move on the arm 210 in the inward direction 240 or the outward direction 230. In this case, when the processor 140 performs the second function by detecting the second movement, the processor 140 may determine whether the direction of the second movement and the direction of the first movement are the same.

As such, if the smart watch 100 has performed the first function, the processor 140 may perform the second function by comparing the direction of the second movement and the direction of the first movement. Specifically, the processor 140 may set a function to be performed in the case that the direction of the first movement and the direction of the second movement are the same differently from a function to be performed in the case that the directions are not the same.

For example, if the direction of the first movement and the direction of the second movement are the same, the processor 140 may perform the first function and then perform the second function. Otherwise, if the direction of the first movement and the direction of the second movement are not the same, the processor 140 may perform the first function and then perform another second function. That is, the processor 140 differently may set a function to be performed, based on whether the direction of the first movement and the direction of the second movement are the same.

For example, the processor 140 may display a menu as the first function. In this case, if the direction of the first movement and the direction of the second movement are the same, the processor 140 may move to and display a lower menu as the second function. Otherwise, if the direction of the first movement and the direction of the second movement are different, the processor 140 may move to and display an upper menu as the second function.

Alternatively, if the direction of the first movement and the direction of the second movement are different, the processor 140 may return to the state before the first function is performed, that is, the state before the smart watch 100 detects movement, as the second function. The second function performed by the processor 140 is not limited to the above-described functions. In addition, the second function may be a predetermined function set by the user or the processor 140.

Figure 5A:
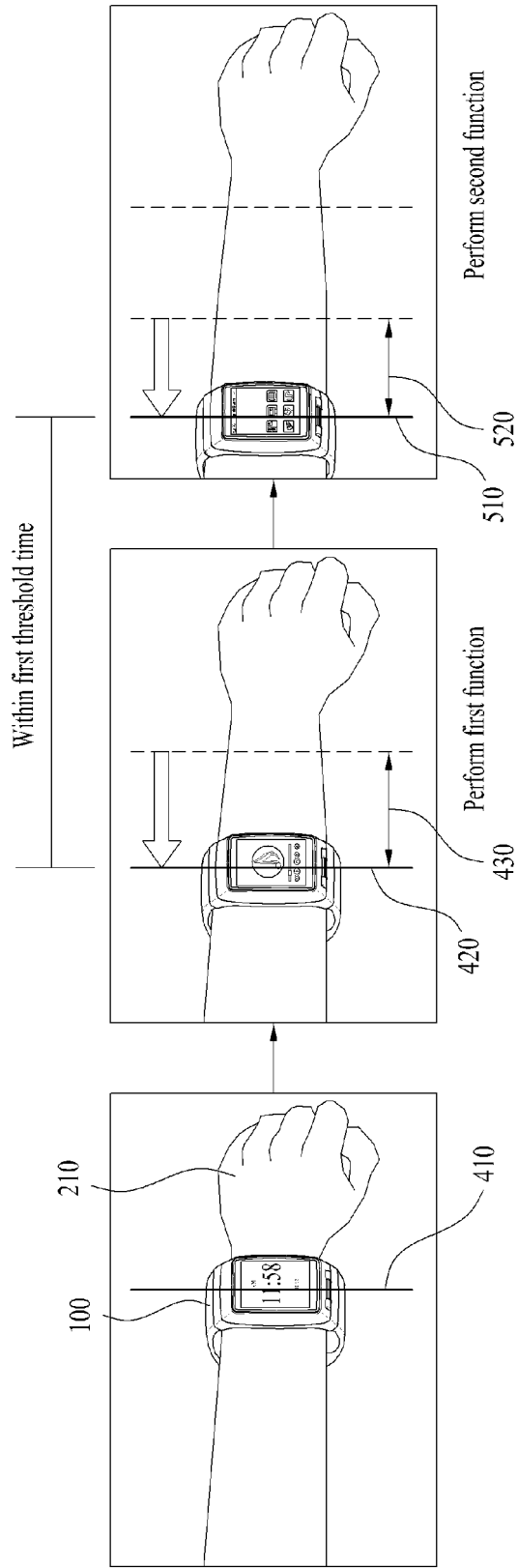

Referring to FIG. 5A, the processor 140 may perform the second function by detecting the second movement. As described above, the processor 140 may detect movement of the smart watch 100 from the first central axis 410 to the second central axis 420, and this movement may be the first movement. In this case, the direction of the first movement may be the inward direction 240. If the distance 430 of the first movement is equal to or more than the threshold distance, the processor 140 may perform the first function corresponding to the inward direction 240.

After the first function is performed, the processor 140 may detect movement from the second central axis 420 to a third central axis 510, and this movement may be the second movement. In this case, the third central axis 510 refers to an axis that passes through the center of the main body 170 after the smart watch 100 moves from the second central axis 420 in the inward direction 240. The distance between the second central axis 420 and the third central axis 510 corresponds to a distance 520 of movement. In this case, the distance 520 may be the distance of the second movement. Since the third central axis 510 corresponds to the inward direction 240 from the second central axis 420, the processor 140 may detect that the smart watch 100 has moved in the inward direction 240. That is, the direction of the second movement may be the inward direction 240.

In this case, the processor 140 may determine whether the distance 520 of the second movement is equal to or more than the threshold distance. As described above, the threshold distance refers to a distance referred by the processor 140 to determine whether to perform a function.

If the distance 520 of the second movement is equal to or more than the threshold distance, the processor 140 may determine whether the smart watch 100 has detected the second movement within the first threshold time. If the second movement is detected within the first threshold time, the processor 140 may perform the second function related to the first function. Otherwise, if the smart watch 100 has detected the second movement after the first threshold time, the processor 140 may perform a new first function. That is, if movement is detected after the first threshold time, the processor 140 may determine this movement as new movement for performing a new function.

According to the disclosure, the direction of the first movement and the direction of the second movement may be the same direction, for example, the inward direction 240. In this case, the second function may be a function to be performed in the case that the direction of the first movement and the direction of the second movement are the same. Alternatively, the direction of the first movement and the direction of the second movement may be the same direction, for example, the outward direction 230.

The processor 140 is not limited to the above description and may set a function corresponding to the inward direction 240 differently from a function corresponding to the outward direction 230.

Referring to FIG. 5B, the processor 140 may perform the second function by detecting the second movement. In this case, the processor 140 may detect that the smart watch 100 moves from the first central axis 410 to the second central axis 420, which may correspond to the first movement.

The processor 140 may perform the first function and then detect that the smart watch 100 moves from the second central axis 420 to a third central axis 530, which may correspond to the second movement. In this case, the third central axis 530 refers to an axis that passes through the center of the main body 170 after the smart watch 100 moves from the second central axis 420 in the outward direction 230. The distance between the second central axis 420 and the third central axis 530 corresponds to a distance 540 of movement. In this case, the distance 540 may be the distance of the second movement. Since the third central axis 530 corresponds to the outward direction 230 from the second central axis 420, the processor 140 may detect that the smart watch 100 has moved in the outward direction 230. That is, the direction of the second movement may be the outward direction 230.

In this case, the processor 140 may determine whether the distance 540 of the second movement is equal to or more than the threshold distance. As described above, the threshold distance refers to a distance referred by the processor 140 to determine whether to perform a function.

If the distance 540 of the second movement is equal to or more than the threshold distance, the processor 140 may determine whether the smart watch 100 has detected the second movement within the first threshold time. If the second movement is detected within the first threshold time, the processor 140 may perform the second function related to the first function. Otherwise, if the smart watch 100 has detected the second movement after the first threshold time, the processor 140 may perform a new first function. That is, if movement is detected after the first threshold time, the processor 140 may determine this movement as new movement for performing a new function.

According to the disclosure, the direction of the first movement and the direction of the second movement may be different directions, for example, the inward direction 240 and the outward direction 230. In this case, the second function may be a function to be performed in the case that the direction of the first movement and the direction of the second movement are different. Alternatively, the direction of the first movement and the direction of the second movement may be different directions, for example, the outward direction 230 and the inward direction 240.

The processor 140 is not limited to the above description and may set a function corresponding to the inward direction 240 differently from a function corresponding to the outward direction 230.

Figure 5C:
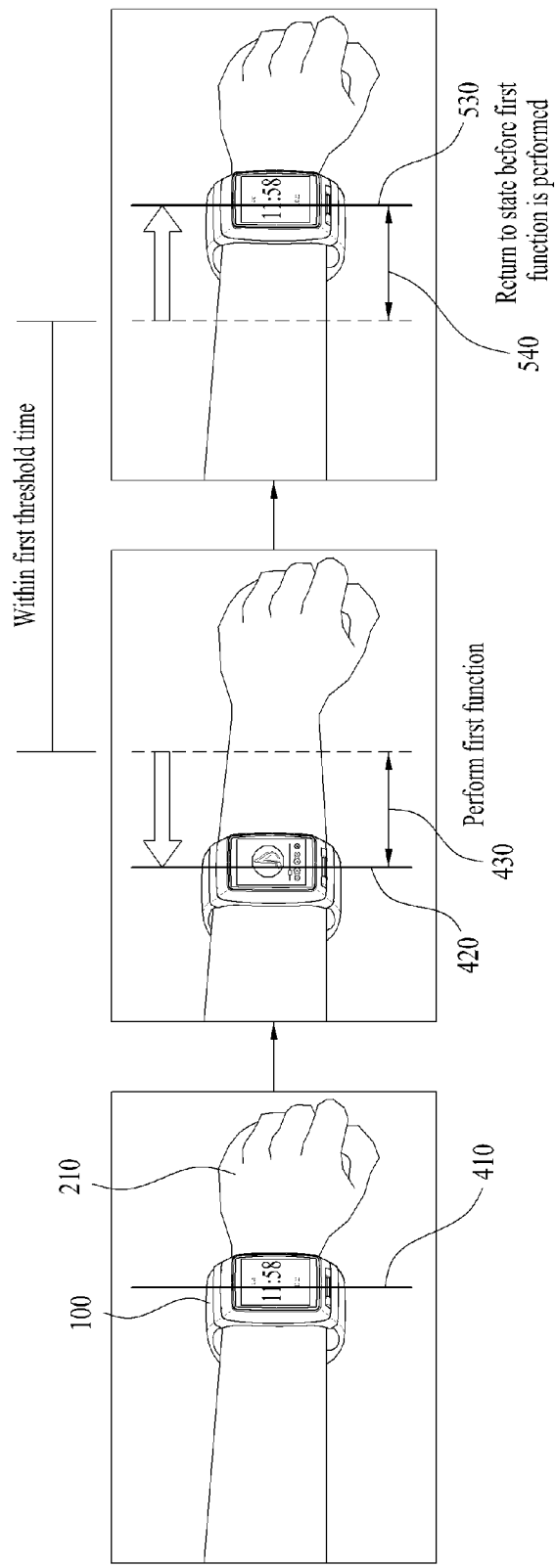

Referring to FIG. 5C, the processor 140 may set the second function as a function of returning to the state before the first function is performed. Specifically, if the direction of the first movement and the direction of the second movement are different as illustrated in FIG. 5B, the processor 140 may set the second function as a function of returning to the state before the first function is performed. That is, the processor 140 may set a command to perform a function and a command to return to the state before the function is performed. As such, the user may control performance of the function of the smart watch 100 using the first movement and the second movement.

In this case, for example, if the smart watch 100 returns to the state before the first function is performed, the smart watch 100 may perform a new first function by detecting new first movement. Specifically, the smart watch 100 may perform the first function to move from an upper menu to a lower menu. After that, the smart watch 100 may detect the second movement and return to the state before the first function is performed. That is, the smart watch 100 may return to the upper menu. After that, if the first movement is detected once again, the smart watch 100 may move back to the lower menu.

For example, if the direction of the first movement and the direction of the second movement are different, the processor 140 may set the second function to be performed, as a function of canceling and resetting the first function. Specifically, the processor 140 may cancel a plurality of functions, as the second function.

Figure 5D:
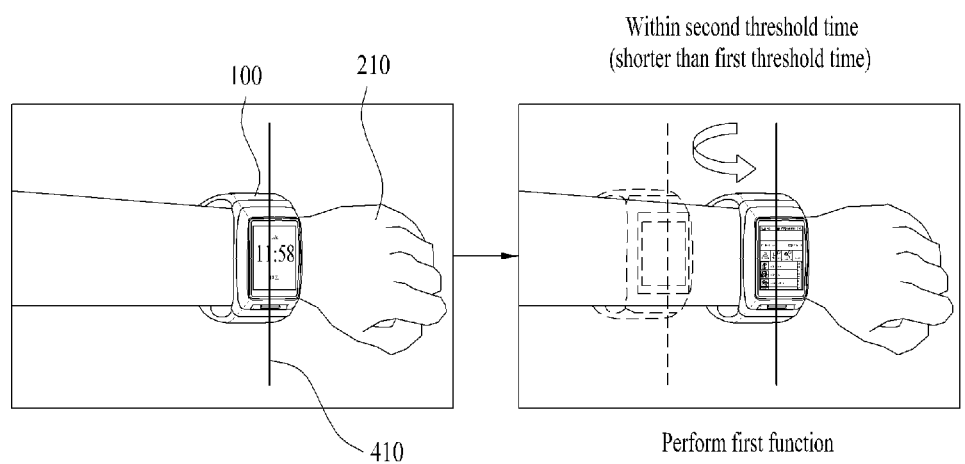

Referring to FIG. 5D, if the smart watch 100 detects the first movement and then detects the second movement within the second threshold time, the smart watch 100 may perform the first function after the second movement is detected. In this case, as described above, the second threshold time is a threshold time for determining whether to perform a function of the smart watch 100. The second threshold time may be shorter than the first threshold time.

Specifically, the processor 140 may detect that the smart watch 100 moves from the first central axis 410 in the inward direction 240 by a distance equal to or more than a first threshold distance. In this case, the movement detected by the processor 140 is the first movement. After that, the processor 140 may detect that the smart watch 100 moves in the outward direction 230 by a distance equal to or more than a second threshold distance. In this case, the movement detected by the processor 140 is the second movement. If the processor 140 detects the first movement and then detects the second movement within the second threshold time, the processor 140 may perform the first function after the second movement is detected. That is, if the processor 140 detects that the smart watch 100 reciprocates on the arm 210, the processor 140 may perform the first function.

In this case, the direction of the first movement and the direction of the second movement may be opposite directions, for example, the inward direction 240 and the outward direction 230, or vice versa.

For example, the processor 140 may operate in the above-described first mode, second mode, or third mode.

According to another embodiment, if the smart watch 100 detects the second movement within the second threshold time, the smart watch 100 may determine that reciprocating movement is detected once. In this case, the smart watch 100 may perform a plurality of functions based on the number of times that reciprocating movement is detected.

As described above, the smart watch 100 may perform different functions based on the direction and distance of movement of the smart watch 100. In this case, the smart watch 100 is not limited thereto and may perform different functions based on the direction and distance of additional movement of the smart watch 100.

According to an embodiment of the disclosure, the processor 140 may store history information regarding the distance and direction of movement in a storage. In this case, the processor 140 may select and perform one of a plurality of functions as the first function based on the history information. For example, the processor 140 may store a fact that the first function is performed according to the direction and distance of the first movement and that the second function is performed according to the direction and distance of the second movement, as the history information. In this case, the second function refers to one of the above-described additional functions corresponding to the second movement. After that, the smart watch 100 may detect new movement and obtain the distance and direction of the new movement. In this case, the smart watch 100 may perform a new first function corresponding thereto based on the stored history information. As such, the smart watch 100 may perform a plurality of functions.

In addition, for example, the history information may be deleted by the user or the processor 140. The smart watch 100 may obtain information regarding performance of a function while the history information is being recorded and select and perform the function as a new function and as the first function.

The processor 140 may differently set a threshold distance and threshold time based on a function to be performed. The threshold distance and threshold time may be changed by the user or the processor 140.

Figure 5E:
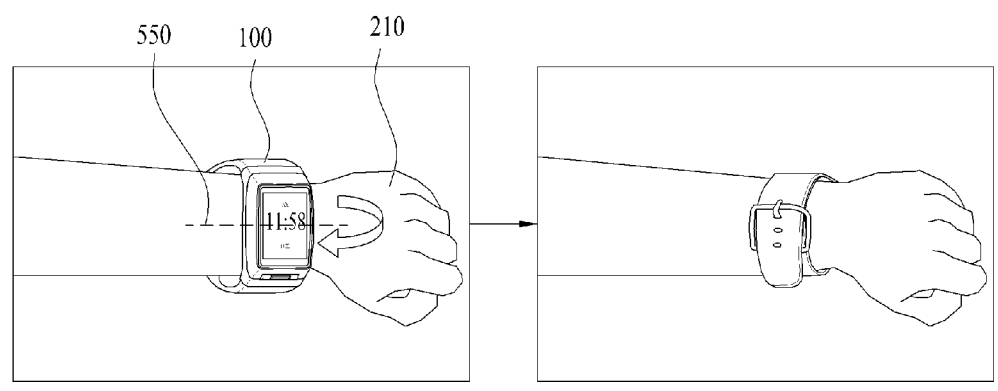

Referring to FIG. 5E, if the processor 140 detects that the smart watch 100 rotates, the processor 140 may obtain the direction and distance of rotation of the smart watch 100. In this case, rotation of the smart watch 100 may refer to rotation on the arm 210 of the user about an axis 550 of the arm 210. Specifically, the smart watch 100 may be fastened loosely by the user. In this case, the smart watch 100 may rotate about the axis 550 of the arm 210. The smart watch 100 may detect rotation using the above-described rotation sensor unit and obtain the direction and distance of rotation. In this case, the direction of rotation refers to the direction of rotation of the smart watch 100 on the arm 210 about the axis 550 of the arm 210. The direction of rotation may be a clockwise direction toward the body of the user from the axis 550 of the arm 210 or a counterclockwise direction away from the body. The distance of rotation may be proportional to the angle of rotation of the smart watch 100.

In this case, if the obtained direction of rotation is a predetermined direction and the obtained distance of rotation is equal to or more than a threshold distance, the smart watch 100 may perform a new function different from the above-described functions. In this case, the new function may be a function related to or regardless of the function corresponding to movement of the smart watch 100 in the inward direction 240 or the outward direction 230.

The processor 140 may perform a function and then provide feedback to notify the user that the function is performed. For example, the feedback may be visual feedback for displaying visual information on the smart watch 100 as the processor 140 performs the function. Alternatively, the feedback may be audio feedback for outputting audio information from the smart watch 100 as the processor 140 performs the function. Otherwise, the feedback may be tactile feedback for providing vibration to notify the user that the function is performed. The smart watch 100 may use at least one of the above-described types of feedback to notify the user that the function is performed.

Figure 6:
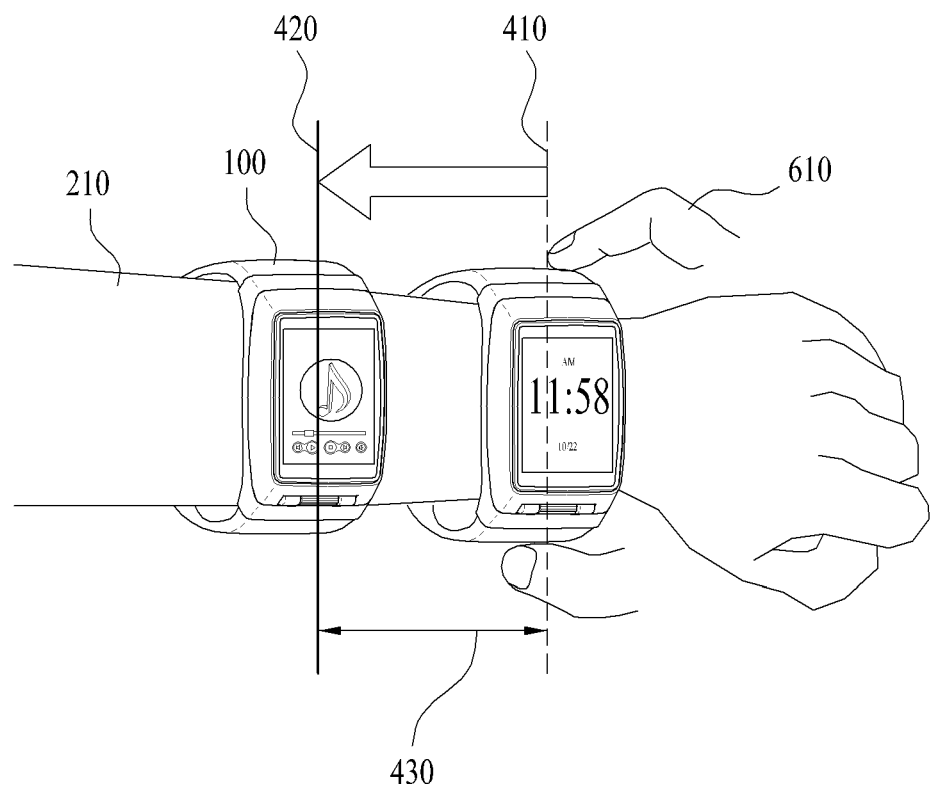
FIG. 6 is a view illustrating a method of performing a function in the case that the smart watch detects additional touch input of a user, according to an embodiment of the disclosure.

FIG. 6 is a view illustrating a method of performing a function in the case that the smart watch 100 detects additional touch input of a user, according to an embodiment of the disclosure. The smart watch 100 may detect additional touch input using the front-surface touch sensor unit. Specifically, the smart watch 100 may detect additional touch input other than the above-described input signals based on whether the smart watch 100 is worn and movement of the smart watch 100. For example, the touch input may be an input signal generated when the user touches a finger 610 on a front surface of the main body 170 or the band 160 of the smart watch 100. In this case, the front surface of the main body 170 or the band 160 refers to a surface where the smart watch 100 does not contact the arm 210 of the user. Specifically, the front surface of the main body 170 or the band 160 may refer to a part where the finger 610 of the user contacts the smart watch 100 to move the smart watch 100.

If the smart watch 100 detects additional contact of the user, the processor 140 may perform a function by detecting movement of the smart watch 100. Specifically, the smart watch 100 may move on the arm 210 regardless of the user's intention. For example, if the user moves, the arm 210 of the user swings and the smart watch 100 may move on the arm 210. In this regard, the smart watch 100 needs to perform a function only as desired by the user. Therefore, if the smart watch 100 detects additional touch input by the finger 610 of the user, the processor 140 may perform a function by detecting movement of the smart watch 100. As such, the smart watch 100 may perform a function only as desired by the user.

Alternatively, if the smart watch 100 detects additional contact of the user and a force applied to the smart watch 100 by a value equal to or more than a predetermined value, the processor 140 may perform a function by detecting movement of the smart watch 100. Specifically, if the smart watch 100 detects additional contact of the user and a certain force applied to the smart watch 100, the processor 140 may perform a function based on movement of the smart watch 100. As such, the smart watch 100 may perform a function in consideration of the user's intention. In this case, the smart watch 100 may include a force sensor for detecting whether a certain force is applied to the smart watch 100. In this case, the force sensor may be a pressure sensor or a gyro sensor.

According to the disclosure, for example, if the force detected by the smart watch 100 is equal to or more than a threshold force that is the predetermined value, the smart watch 100 may perform a function. In this case, the threshold force is a threshold force for determining whether the detected force corresponds to input for performing a function. The threshold force may be set to have a certain error range, and whether movement is detected may be determined based on the force within the error range.

According to an embodiment, if the smart watch 100 receives a command to perform a function from the user or the processor 140, the smart watch 100 may perform the function. Specifically, the smart watch 100 may be set not to perform a function even when movement of the smart watch 100 on the arm 210 is detected. Specifically, the smart watch 100 may be set not to activate sensing of horizontal movement. In this case, if the smart watch 100 receives a command to perform a function from the user or the processor 140, the smart watch 100 may enter a mode or state for performing the function and perform the function.

FIGS. 7A to 7D are views illustrating a control method of the smart watch 100, according to an embodiment of the disclosure.

Figure 7A:
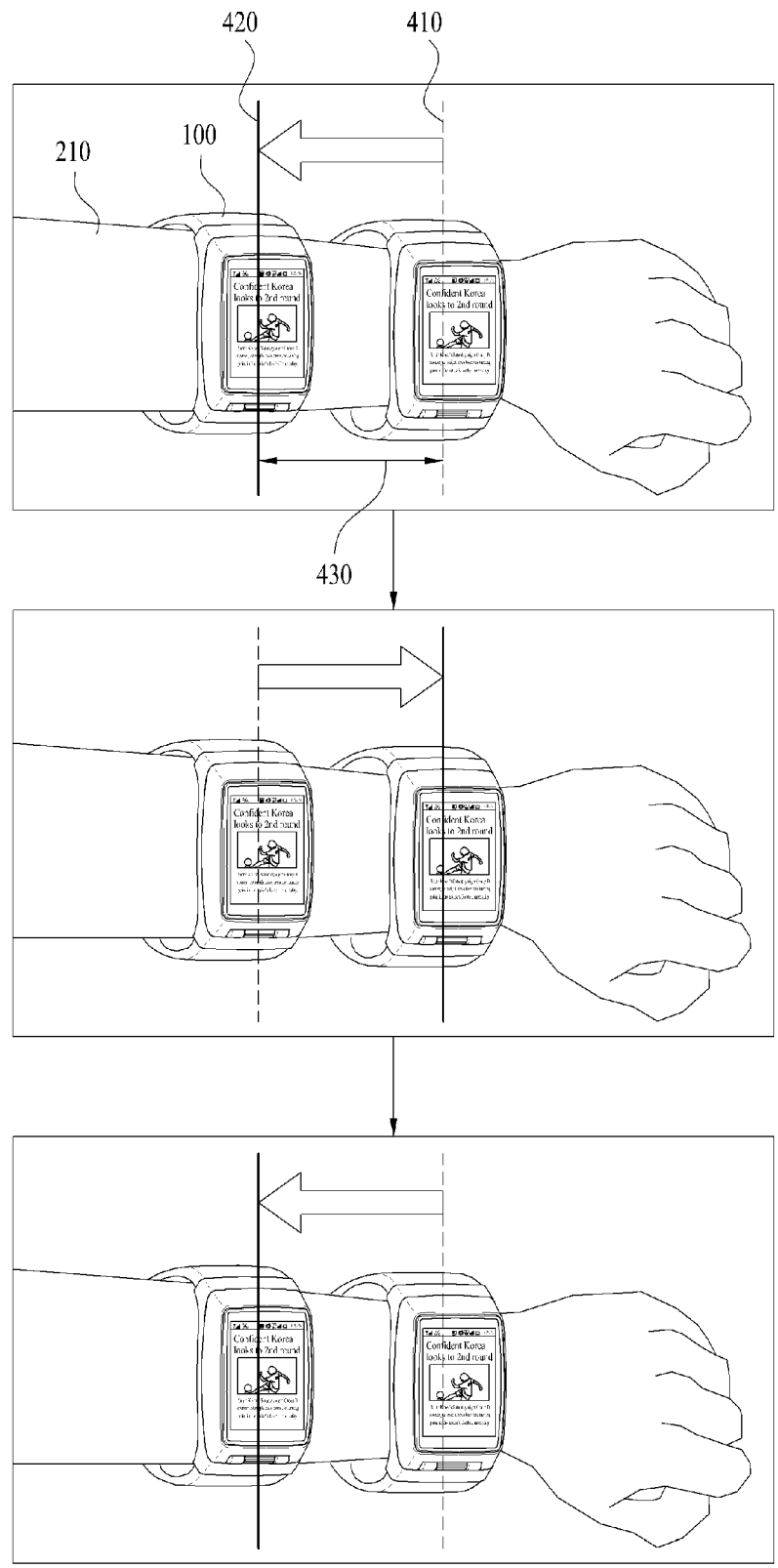
FIGS. 7A to 7D are views illustrating a control method of the smart watch, according to an embodiment of the disclosure.

Referring to FIG. 7A, the smart watch 100 may capture an image of visual information displayed on the smart watch 100 and store the captured image, as a first function.

After the image is captured, the smart watch 100 may return to a previous operation and perform another operation in the returned state, as a second function. After that, if first movement is detected again, the smart watch 100 may re-display the above-described captured image.

Figure 7B:
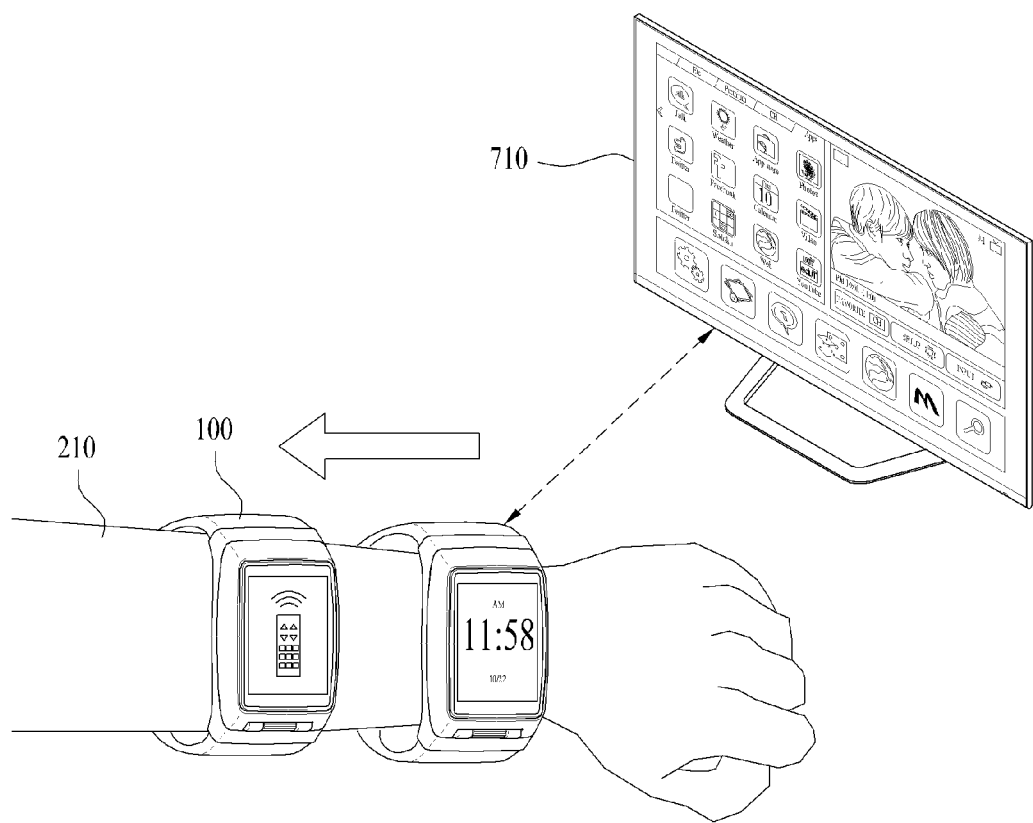
Figure 7C:
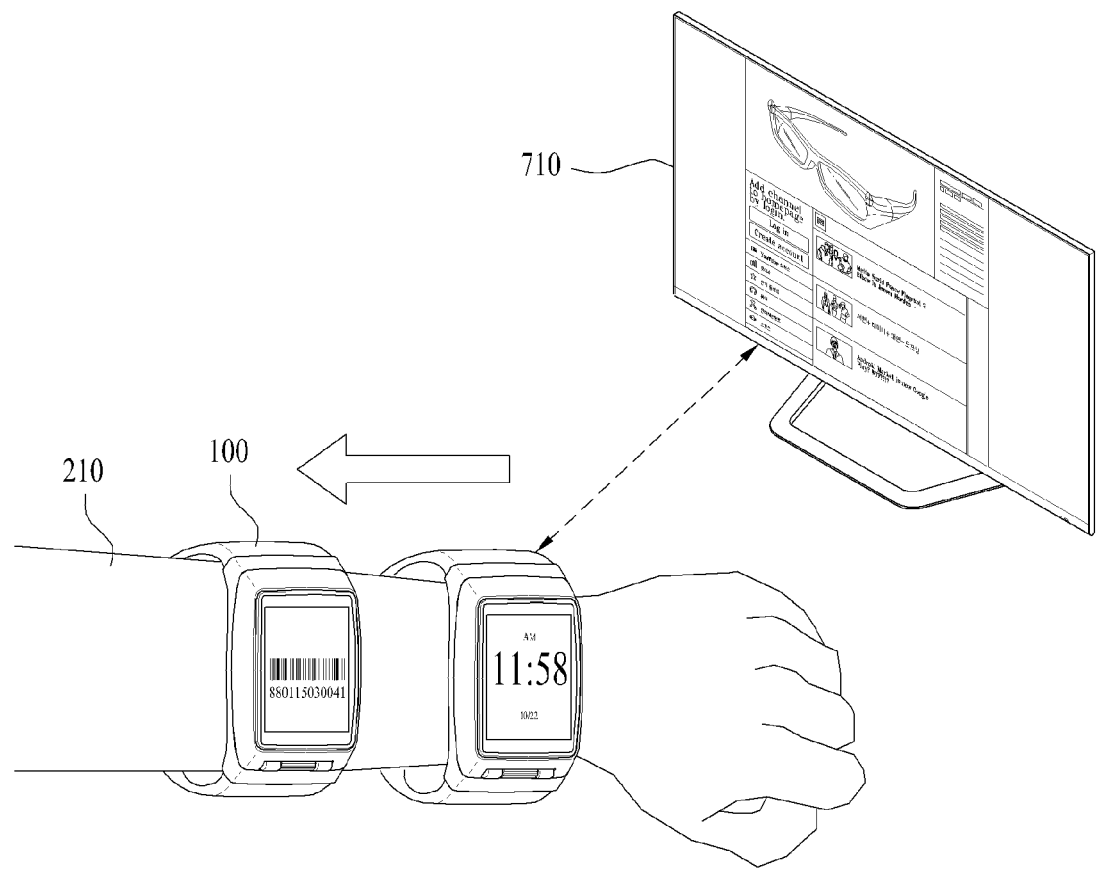

Referring to FIGS. 7B and 7C, a communication unit (not shown) may communicate with an external device 710 using various protocols and thus exchange data. In addition, the communication unit may be connected to a network in a wired or wireless manner and exchange digital data such as content. According to the disclosure, the smart watch 100 may transmit a command regarding a function performed by the smart watch 100, via the communication unit to the external device 710.

According to an embodiment, the command regarding a function may be a command to control the external device 710. In addition, the smart watch 100 may transmit a command to the external device 710 to make payment. In detail, the smart watch 100 may transmit a signal to the external device 710 based on a function performed by the smart watch 100. The external device 710 may perform a certain function based on the received signal. According to an embodiment, the certain function performed by the external device 710 may correspond to a command to control the external device 710. The external device 710 may execute a command to make payment based on a value set by the smart watch 100.

According to another embodiment, instead of transmitting a command to the external device 710, the smart watch 100 may perform a function of executing a mode for transmitting a command. Alternatively, the smart watch 100 may perform a function of executing an application for transmitting a command.

Figure 7D:
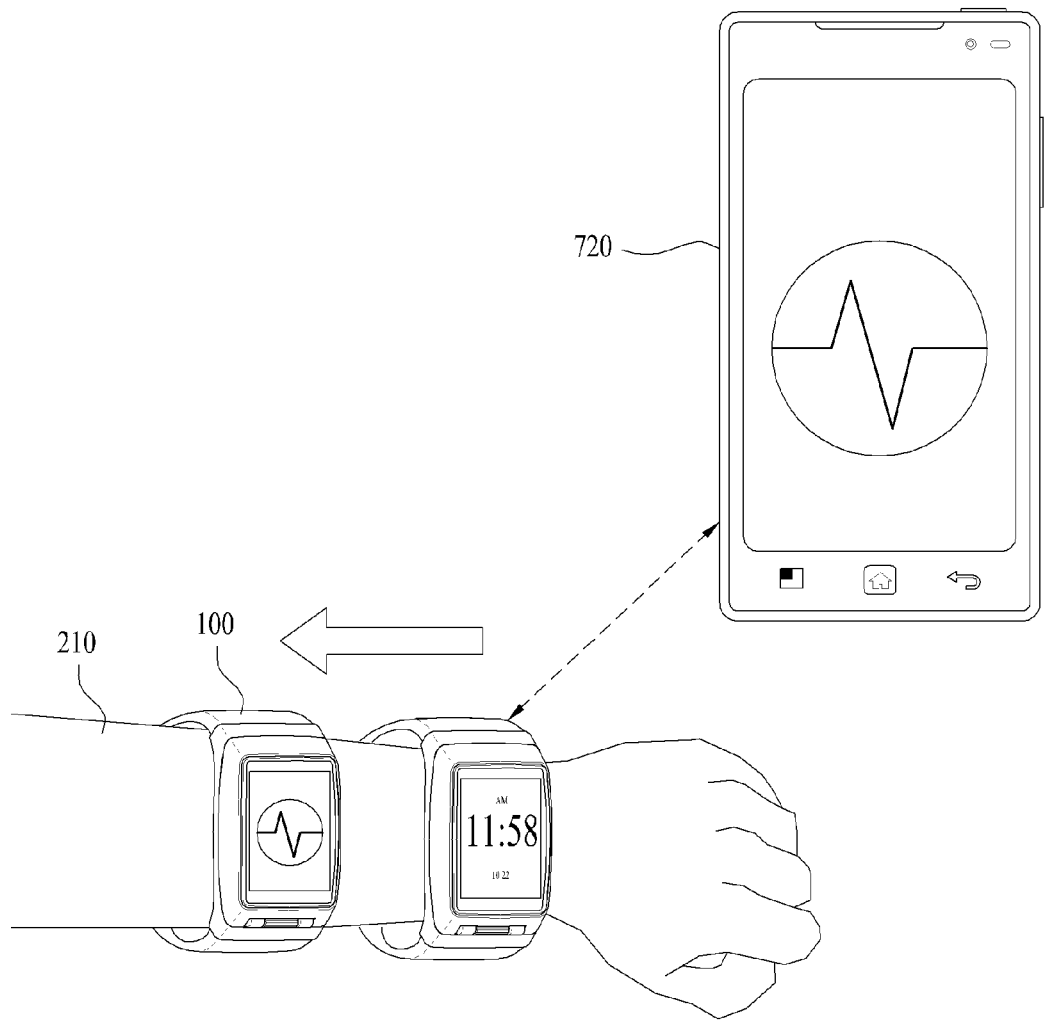

Referring to FIG. 7D, a function performed by the smart watch 100 may be a function of connecting a link to or disconnecting a link from a portable device 720 interworking with the smart watch 100. Here, the portable device 720 refers to a portable electronic device. According to an embodiment, the portable device 720 may include various electronic devices such as a mobile phone, a tablet PC, a phablet, a laptop computer, and a personal digital assistant (PDA).

According to an embodiment, when the smart watch 100 performs a function, the smart watch 100 may display visual information displayed on the portable device 720. In addition, the smart watch 100 may display an area expanded from the display of the portable device 720.

According to an embodiment, when the portable device 720 and the smart watch 100 perform the same operation in an interworking mode, the smart watch 100 may perform a function of disconnecting a link between the smart watch 100 and the portable device 720 in such a manner that the smart watch 100 and the portable device 720 are used independently.

FIGS. 8A to 8G are views illustrating a control method of the smart watch 100, according to another embodiment of the disclosure.

Figure 8A:
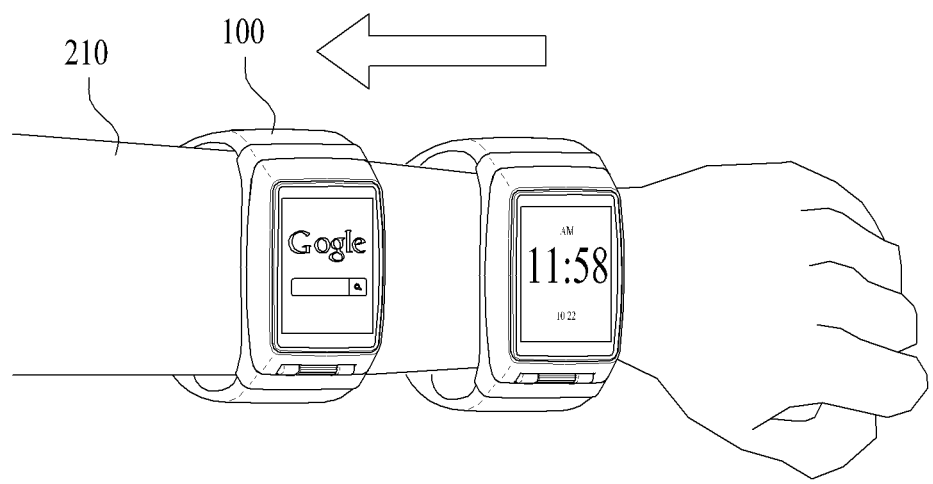
FIGS. 8A to 8G are views illustrating a control method of the smart watch, according to another embodiment of the disclosure.

Referring to FIG. 8A, the smart watch 100 may perform a function of executing a search mode. In addition, the smart watch 100 may display visual information regarding the search mode. According to an embodiment, the smart watch 100 may transmit a command to input visual information or audio information for executing the search mode, to a user as feedback regarding the function.

Figure 8B:
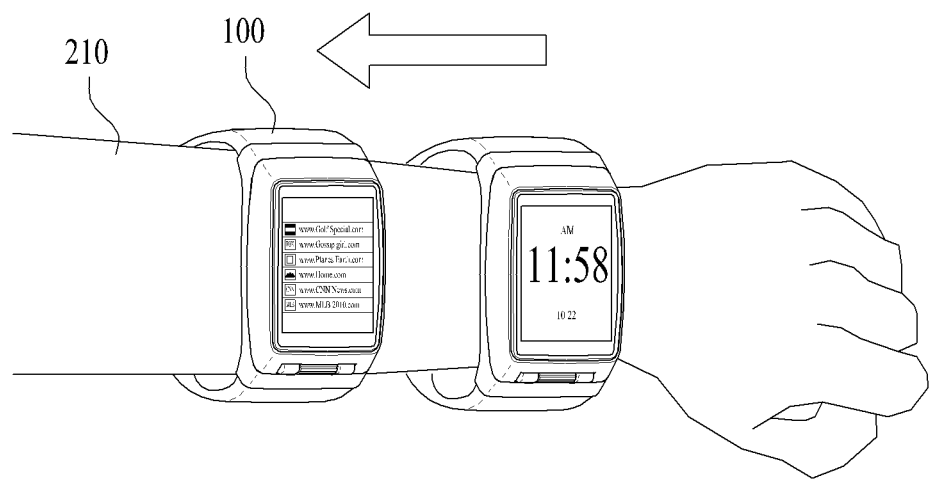
Figure 8B:
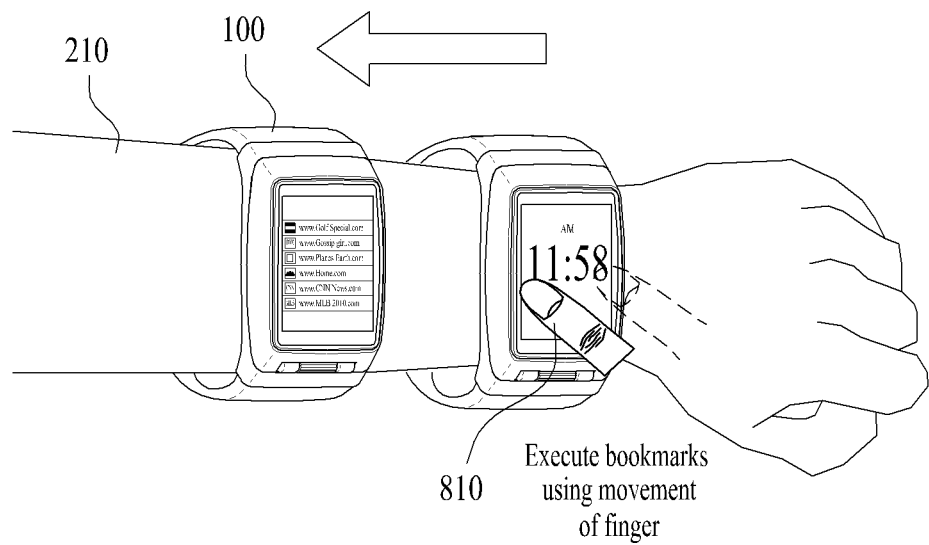

Referring to FIG. 8B, according to an embodiment, the smart watch 100 may perform a function of bookmarking content displayed on the smart watch 100. In addition, the smart watch 100 may display a bookmark list of bookmarked content as feedback regarding the function.

According to an embodiment, if the smart watch 100 executes bookmarks using movement of a finger 810 or another command, the smart watch 100 may perform a function of displaying the bookmark list.

Figure 8C:
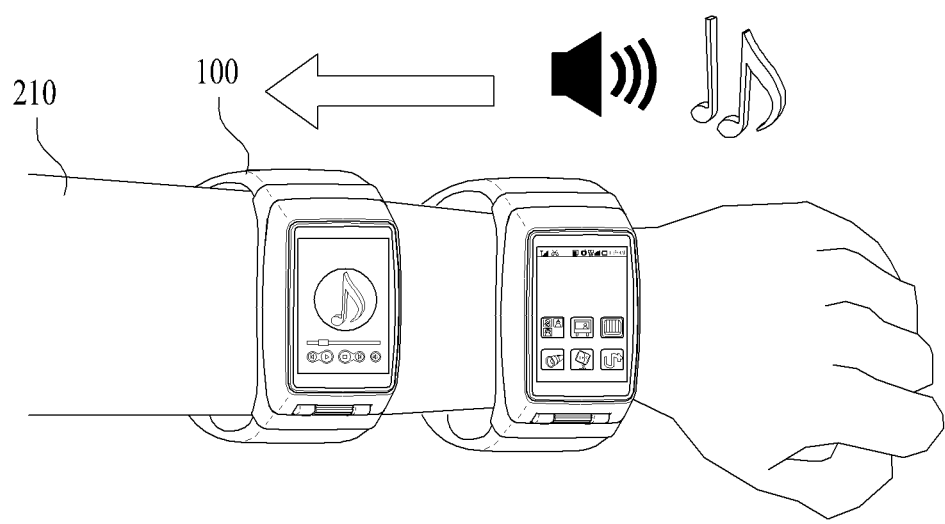

Referring to FIG. 8C, according to an embodiment, the smart watch 100 may execute a mode or application for providing only audio information while visual information is not be displayed. In this case, the smart watch 100 may perform a function of displaying visual information related to the audio information. In detail, according to an embodiment, when a background image is displayed and a music application is executed only to output audio, the smart watch 100 may perform a function of displaying visual information regarding the music application. Alternatively, when a background image is displayed and a navigation application is executed only to output audio, the smart watch 100 may perform a function of displaying visual information regarding the navigation application.

Figure 8D:
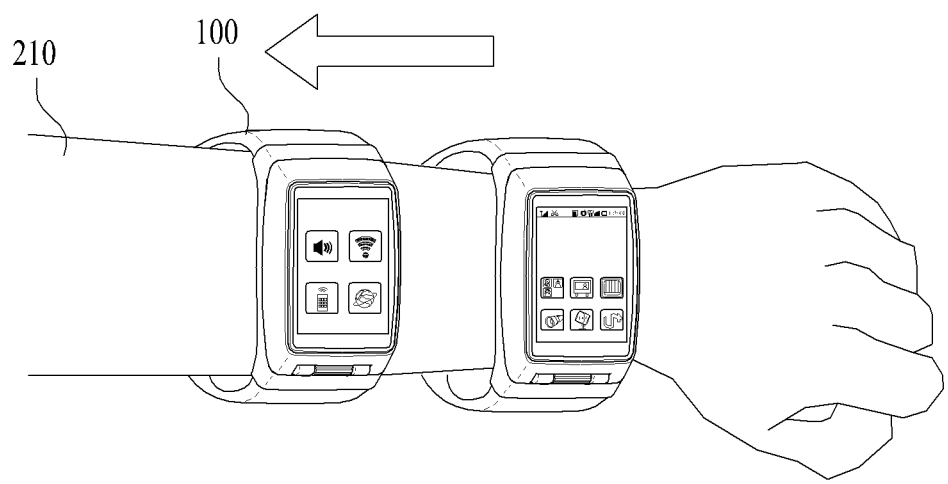

Referring to FIG. 8D, according to an embodiment, the smart watch 100 may perform a function of switching on or off a setup value. According to an embodiment, the setup value may be a value predetermined by the user or the processor 140 and be changed by the user or the processor 140.

Figure 8E:
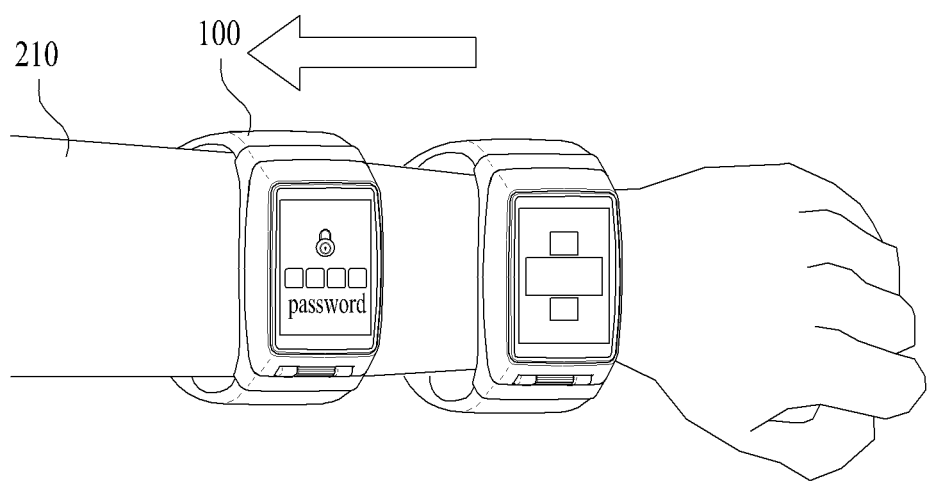

Referring to FIG. 8E, according to an embodiment, the smart watch 100 may perform a function of converting separated user interface structures. Specifically, according to an embodiment, the smart watch 100 may perform a function of converting a public application allowing access into a private application restricting access.

Figure 8F:
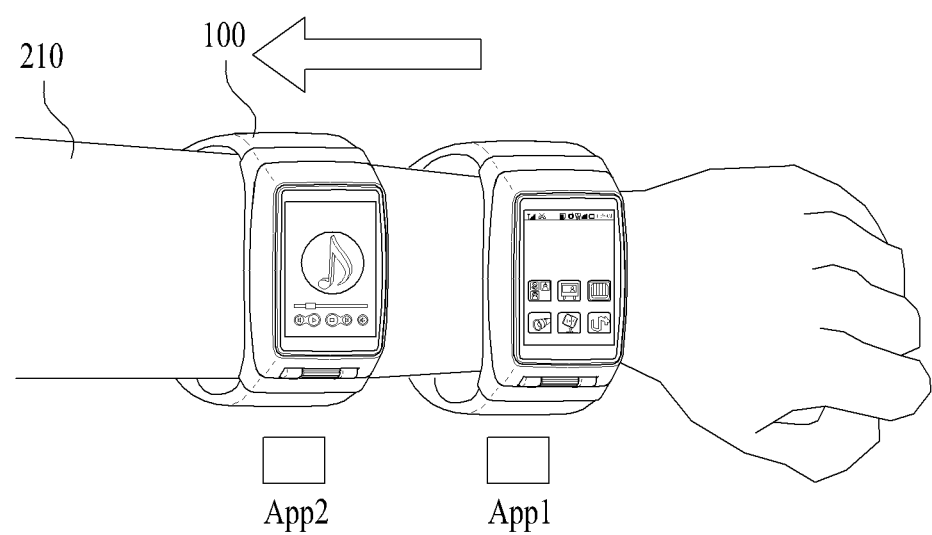

Referring to FIG. 8F, according to an embodiment, the smart watch 100 may perform a function of switching applications. In detail, according to an embodiment, the processor 140 may perform a function of switching from a currently performed application to a previously performed application. In addition, the processor 140 may perform a function of switching to a predetermined application.

Figure 8G:
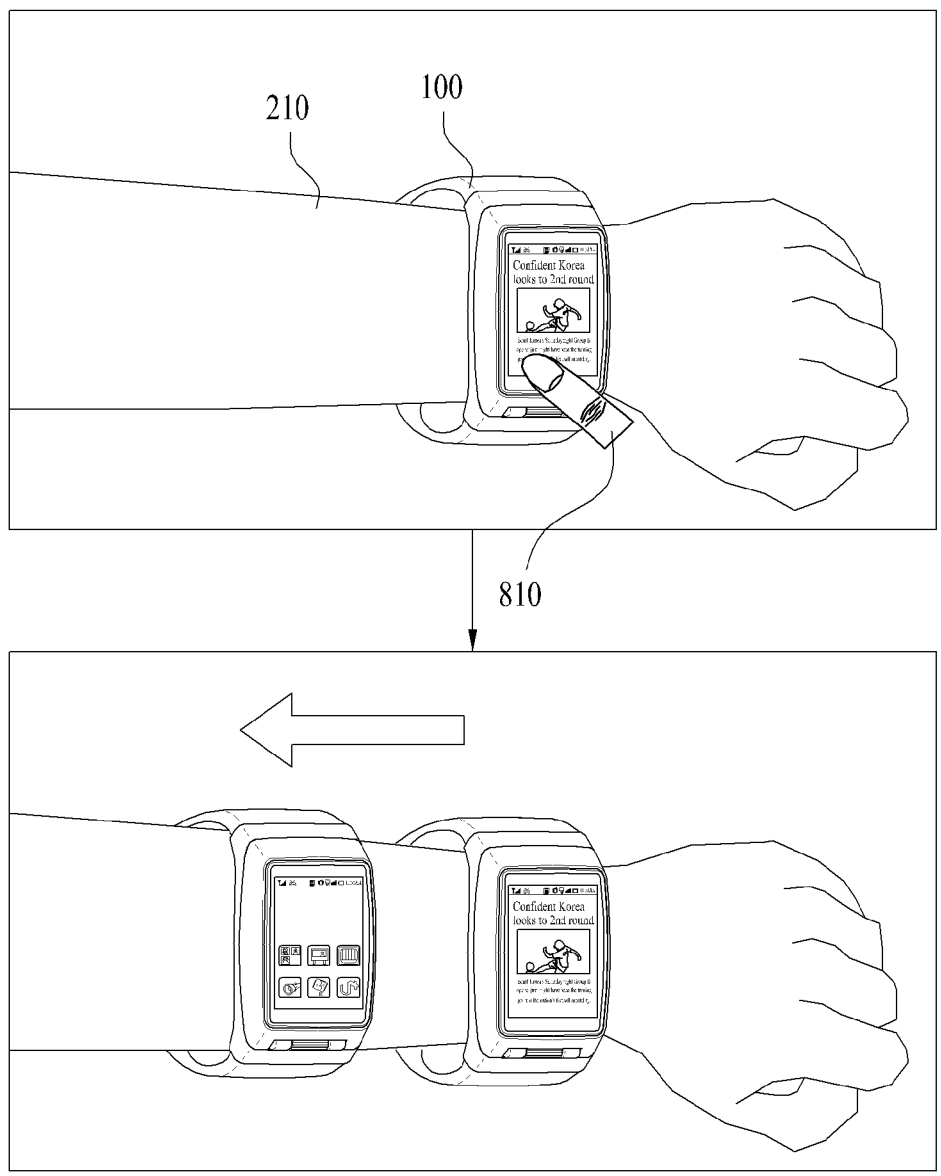

Referring to FIG. 8G, according to an embodiment, the smart watch 100 may perform a function of returning to a function previously performed by the smart watch 100 or to the state before an application is executed.

FIGS. 9A to 9E are views illustrating a control method of the smart watch 100, according to another embodiment of the disclosure.

Specifically, when the smart watch 100 receives a call signal, the smart watch 100 may perform a function of starting a call based on the received call signal. Alternatively, the smart watch 100 may perform a function of rejecting a call based on the received call signal.

Figure 9A:
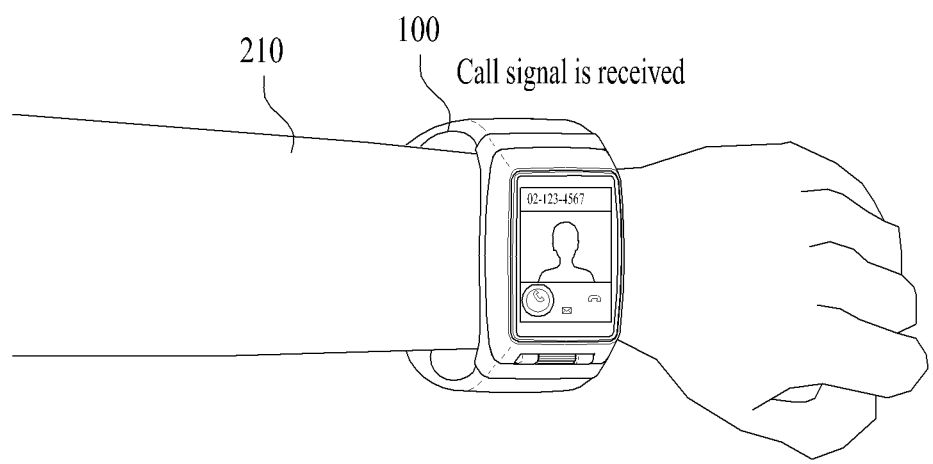
FIGS. 9A to 9E are views illustrating a control method of the smart watch, according to another embodiment of the disclosure.
Figure 9B:
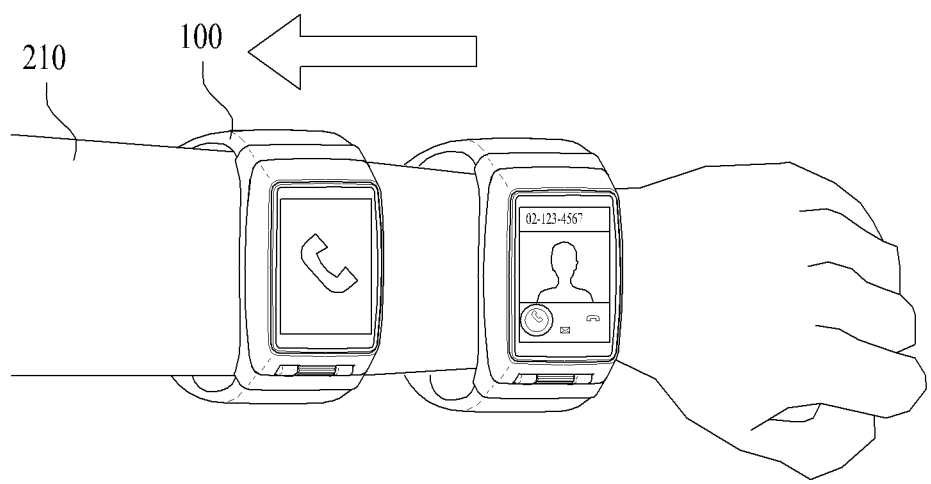
Figure 9C:
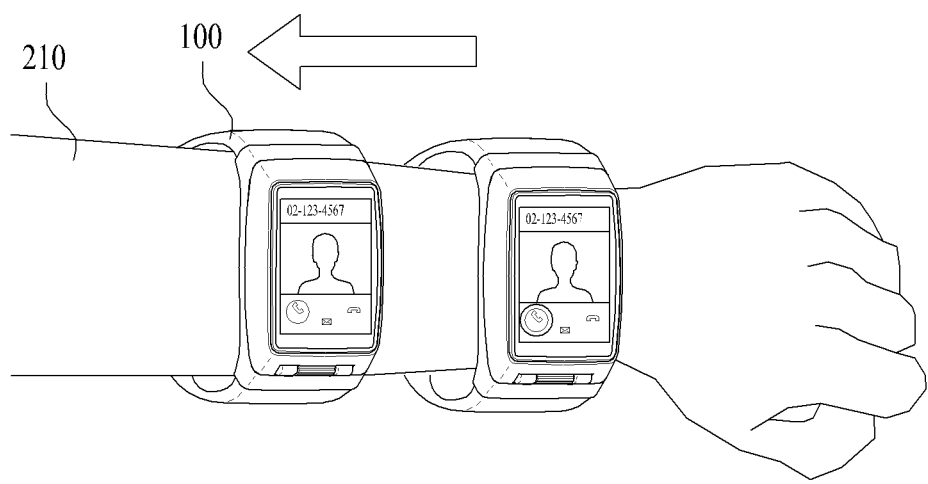
Figure 9D:
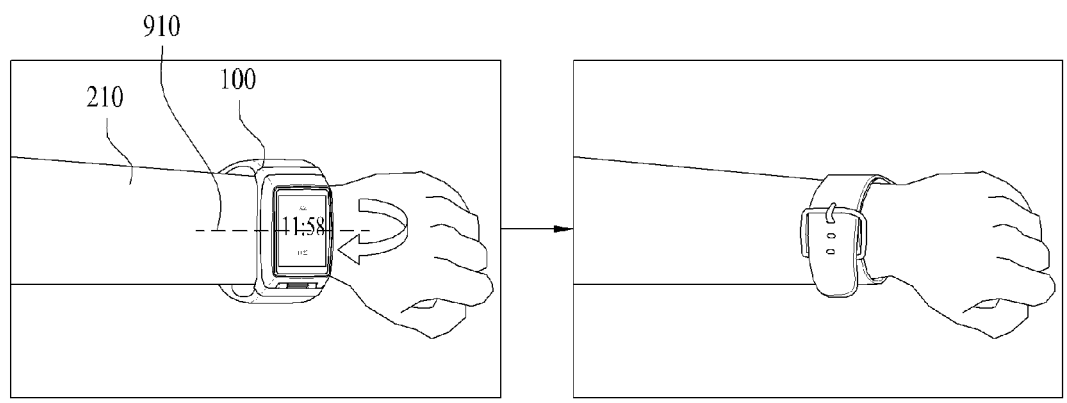
Figure 9E:
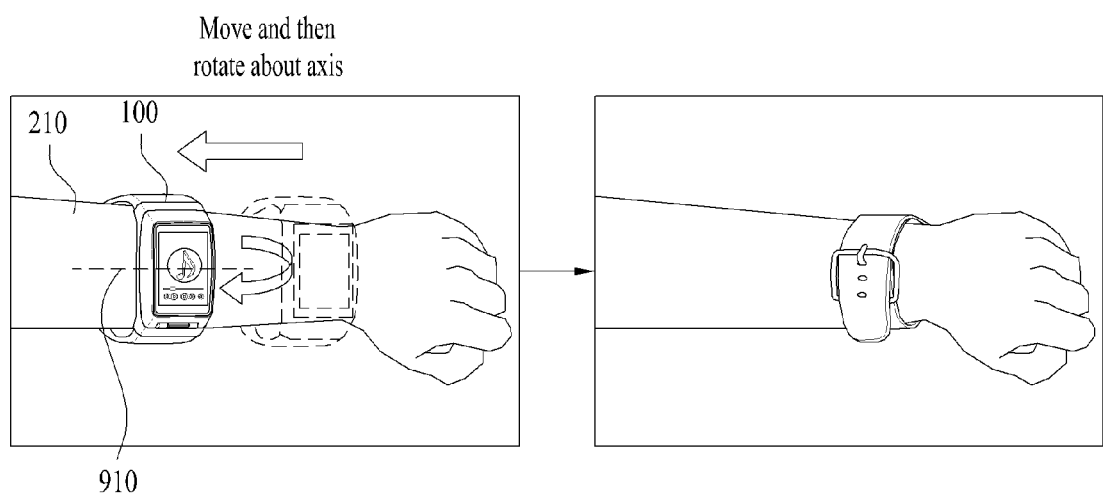

Referring to FIG. 9A, according to an embodiment, when the smart watch 100 receives a call signal, reception information is displayed. In this case, referring to FIG. 9B, the smart watch 100 may perform a function of starting a call based on the received call signal. Alternatively, referring to FIG. 9C, if the smart watch 100 receives a call signal and vibration, the smart watch 100 may perform a function of eliminating vibration only. Otherwise, referring to FIG. 9D, the smart watch 100 may detect rotation about the rotation axis 910 and thus perform a function of rejecting a call based on the call signal. Referring to FIG. 9E, if the smart watch 100 detects rotation and then detects movement, the smart watch 100 may perform a function of transmitting a message related to rejection of a call, to a caller. Otherwise, according to an embodiment, if the smart watch 100 detects movement and then detects rotation, the smart watch 100 may perform a function of transmitting a message related to rejection of a call, to a caller.

According to the disclosure, functions performed by the smart watch 100 when the smart watch 100 receives a call signal may be set by the user or the processor 140 and are not limited to the above-described functions.

Figure 10:
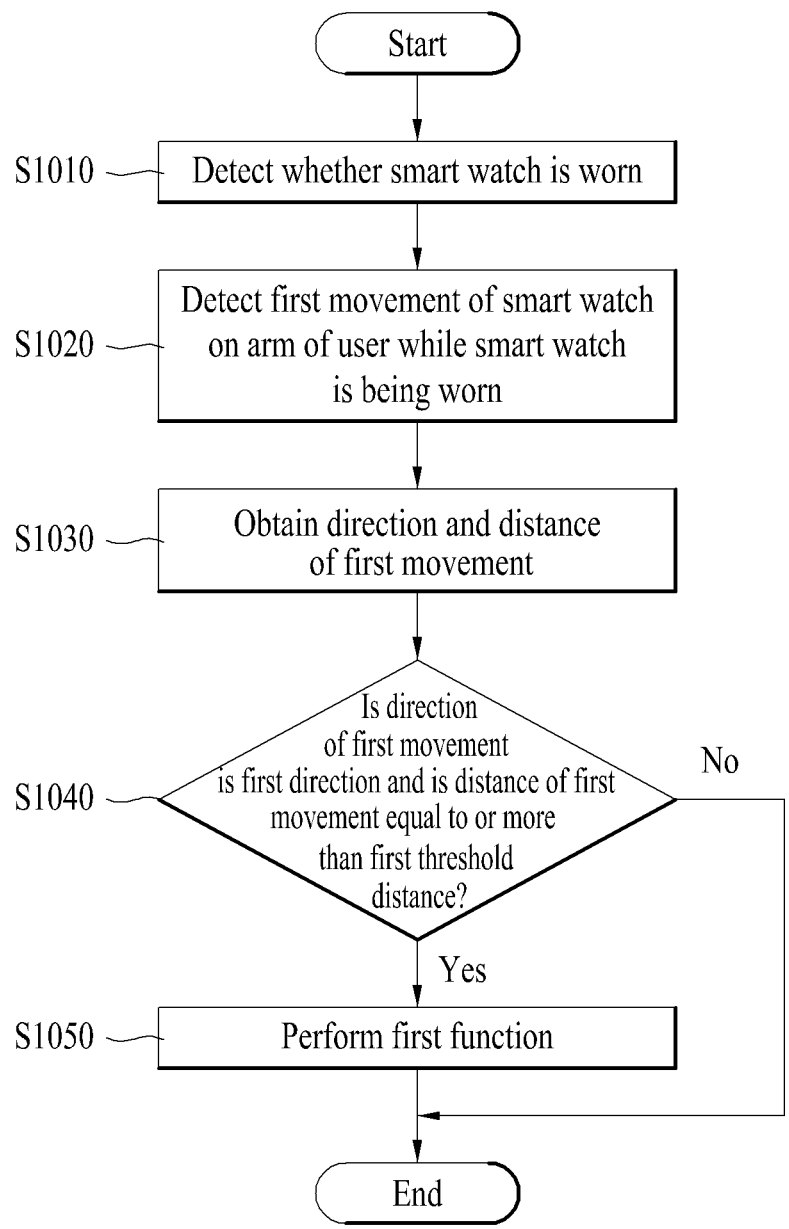
FIG. 10 is a flowchart of a control method of the smart watch, according to an embodiment of the disclosure.

FIG. 10 is a flowchart of a control method of the smart watch 100, according to an embodiment of the disclosure. In the following description, each step of the method may be controlled by the processor 140 illustrated in FIG. 1. Detailed descriptions of parts the same as or corresponding to those described above in relation to FIGS. 1 to 9 will not be provided here.

The smart watch 100 may detect whether the smart watch 100 is worn (S1010). As described above in relation to FIGS. 1 and 2, the smart watch 100 may detect whether the smart watch 100 is worn using the wearing sensor unit 110 including at least one of a sensor included in the buckle 150 and sensors included in a rear surface of the main body 170 or the band 160. Specifically, if the smart watch 100 is buckled, the smart watch 100 may determine that the smart watch 100 is worn by a user. Alternatively, the smart watch 100 may detect whether the smart watch 100 is worn using a touch sensor included in the rear surface of the main body 170 or the band 160. Specifically, if the smart watch 100 senses touch of the user on the rear surface of the main body 170 or the band 160, the smart watch 100 may determine that the smart watch 100 is worn by the user.

Then, the smart watch 100 may detect first movement of the smart watch 100 on the arm 210 of the user while the smart watch 100 is being worn (S1020). As described above in relation to FIGS. 1 and 2, the smart watch 100 may detect the first movement using the movement sensor unit 130. In this case, the movement sensor unit 130 may include at least one of the above-described proximity sensor, touch sensor, gyro sensor, acceleration sensor, and gravity sensor to detect movement of the smart watch 100 based on a time when a signal varies or a position of the smart watch 100. Specifically, the smart watch 100 may detect movement of the smart watch 100 by measuring a time when a signal varies as the smart watch 100 moves. Alternatively, the smart watch 100 may detect movement of the smart watch 100 based on variation in coordinates of the smart watch 100 detected on the arm 210.

Then, the smart watch 100 may obtain the direction and distance of the detected first movement (S1030). In this regard, as described above in relation to FIG. 3, the smart watch 100 may move on the arm 210 along the axis 220 of the arm 210 in the inward direction 240 or the outward direction 230. In this case, the distance of the first movement may be a distance by which the smart watch 100 moves on and along the arm 210. According to the disclosure, the distance of the first movement may vary based on tightness of the band 160. When the smart watch 100 is worn by the user, the smart watch 100 may be fastened sufficiently loosely to move on the arm 210. In this case, according to an embodiment, the user may adjust tightness of the band 160. Here, as described above, the processor 140 may adjust a threshold distance corresponding to a reference value regarding the distance of the first movement of the smart watch 100, based on tightness. The band 160 may be formed of a flexible or bendable material to achieve smooth movement of the smart watch 100.

Then, the smart watch 100 may detect whether the direction of the first movement is a first direction and the distance of the first movement is equal to or more than a first threshold distance (S1040). In this case, as described above in relation to FIGS. 4A and 4B, the first threshold distance is a reference distance or threshold distance for performing a function, and may have an error range. The first threshold distance may have a value predetermined by the user or the processor 140, and be changed based on tightness of the smart watch 100, and the height, direction, and position of the arm 210. As described above, the direction of the first movement may be the inward direction 240 or the outward direction 230.

In S1040, if the distance of the first movement of the smart watch 100 is less than the first threshold distance, the smart watch 100 may not perform a function corresponding to the detected first movement. Otherwise, if the direction of the first movement of the smart watch 100 is the first direction and the distance of the first movement is equal to or more than the first threshold distance, the smart watch 100 may perform a first function (S1050). In this case, as described above in relation to FIG. 4A, if the smart watch 100 moves on the arm 210 along the axis 220 of the arm 210 in the inward direction 240 by a distance equal to or more than a threshold distance, the processor 140 may perform the first function. In this case, the processor 140 may perform the first function corresponding to the inward direction 240. Alternatively, as described above in relation to FIG. 4B, the processor 140 may perform the first function corresponding to the outward direction 230.

FIG. 11 is a flowchart of a control method of the smart watch 100, according to another embodiment of the disclosure. Specifically, FIG. 11 illustrates a method of, by the smart watch 100, performing a second function by detecting second movement as additional movement after the first function is performed as described above in relation to FIG. 10. Detailed descriptions of parts the same as or corresponding to those described above in relation to FIGS. 1 to 10 will not be provided here.

Initially, the smart watch 100 may perform a first function (S1110). In this case, as described above in relation to FIGS. 4A and 4B, the smart watch 100 may perform the first function by detecting first movement. After that, the smart watch 100 may perform an additional function by detecting additional movement.

Then, the smart watch 100 may detect second movement on the arm 210 of a user of the smart watch 100 (S1120). In this case, as described above in relation to FIGS. 5A to 5E, movement detected by the smart watch 100 to perform the first function is referred to as the first movement, and movement detected by the smart watch 100 to perform the additional function is referred to as second movement. In this case, the smart watch 100 may detect the second movement using the movement sensor unit 130.

Then, the processor 140 may obtain the direction and distance of the detected second movement (S1130). As described above in relation to FIGS. 5A to 5E, the direction of the first movement and the direction of the second movement may be the same direction, for example, the inward direction 240. In this case, the second function may be a function to be performed in the case that the direction of the first movement and the direction of the second movement are the same. Alternatively, the direction of the first movement and the direction of the second movement may be the same direction, for example, the outward direction 230. In this case, the second function may be a function to be performed in the case that the direction of the first movement and the direction of the second movement are the same. Otherwise, the second function may be a function to be performed in the case that the direction of the first movement and the direction of the second movement are different. In this case, the direction of the first movement and the direction of the second movement may be different directions, for example, the inward direction 240 and the outward direction 230. Alternatively, the direction of the first movement and the direction of the second movement may be different directions, for example, the outward direction 230 and the inward direction 240. In this case, the second function may be a function to be performed in the case that the direction of the first movement and the direction of the second movement are different.

Then, the processor 140 may detect whether the distance of the second movement is equal to or more than a first threshold distance (S1140). In this case, as described above in relation to FIGS. 4A and 4B, the first threshold distance is a reference distance or threshold distance for performing a function, and may have an error range. The first threshold distance may have a value predetermined by the user or the processor 140, and be changed based on tightness of the smart watch 100, and the height, direction, and position of the arm 210. The direction of the second movement may be the inward direction 240 or the outward direction 230.

Then, if the distance of the second movement is equal to or more than the first threshold distance, the smart watch 100 may detect whether the second movement is detected within a first threshold time (S1150). In this case, as described above in relation to FIGS. 5A to 5E, if the processor 140 detects that the distance of the second movement is equal to or more than a threshold distance, the processor 140 may detect whether the second movement is detected within the first threshold time. In this case, the first threshold time may be a threshold time for determining the second movement. Specifically, if the processor 140 detects that the smart watch 100 moves within the first threshold time from when the smart watch 100 performs the first function, the processor 140 may detect this movement as the second movement. In this case, the processor 140 may perform the second function related to the first function.

Otherwise, if the processor 140 detects that the smart watch 100 moves after the first threshold time from when the smart watch 100 performs the first function, the processor 140 may detect this movement as new first movement regardless of the first function. In this case, the processor 140 may perform a new first function. In addition, if the processor 140 detects that the distance of the second movement is equal to or more than the threshold distance, the processor 140 may determine whether the second movement is detected within a second threshold time.

In this case, the second threshold time may be shorter than the first threshold time. The second threshold time may be a threshold time for determining the first movement and the second movement as integrated movement. Specifically, if the processor 140 detects the second movement within the second threshold time from when the first movement is detected, the processor 140 may perform the first function after the first movement and the second movement are completely detected. That is, the processor 140 may perform the first function after the second movement is detected, not when the first movement is detected.

As described above in relation to FIGS. 5A to 5E, the smart watch 100 may operate in a first mode, second mode, or third mode for applying the first threshold time and/or the second threshold time. Specifically, the smart watch 100 may operate in the first mode for applying only the first threshold time. Alternatively, the smart watch 100 may operate in the second mode for applying only the second threshold time. Otherwise, the smart watch 100 may operate in the third mode for applying both the first threshold time and the second threshold time.

Then, if the second movement is detected within the first threshold time, the smart watch 100 may perform the second function (S1160). In this regard, as described above in relation to FIGS. 5A to 5E, if the smart watch 100 detects the second movement within the second threshold time from when the first movement is detected, second threshold time, the smart watch 100 may perform the first function after the second movement is detected. Specifically, if the processor 140 detects that the distance of the second movement is equal to or more than the threshold distance, the processor 140 may determine whether the second movement is detected within the first threshold time. In this case, if the processor 140 detects that the smart watch 100 moves within the first threshold time, the processor 140 may determine this movement as the second movement related to the first function. In this case, the processor 140 may perform the second function related to the first function.

Then, if the second movement is detected after the first threshold time, the second function related to the first function is not performed and a new first function is performed (S1170). In this regard, as described above in relation to FIGS. 5A to 5E, if the processor 140 detects that the smart watch 100 moves after the first threshold time from when the smart watch 100 performs the first function, the processor 140 may detect this movement as new first movement regardless of the first function. In this case, the processor 140 may perform the new first function.

Although the drawings have been separately described for convenience of explanation, two or more embodiments described in relation to the drawings may be combined into a new embodiment. In addition, a computer-readable recording medium having recorded thereon a computer program to execute the above-described embodiments may be designed as needed within the scope of the disclosure.

The smart watch and the control method thereof according to the disclosure are not limited to the configurations and methods of the above-described embodiments, and all or some of the embodiments may be selectively combined to achieve various modifications.

As is apparent from the above description, according to an embodiment, a smart watch may perform a function by detecting movement of the smart watch on an arm of a user.

According to another embodiment, a smart watch may perform different functions based on the direction and distance of movement of the smart watch.

According to another embodiment, a smart watch may perform different functions based on a time when movement of the smart watch is detected.

According to another embodiment, a smart watch may perform different functions based on the direction and distance of rotation of the smart watch.

According to another embodiment, a smart watch may perform a function only if additional contact of a user is detected on a front surface of the smart watch.

According to another embodiment, a smart watch may provide feedback regarding performance of a function to a user.

According to another embodiment, a smart watch may provide feedback regarding performance of a function to a user using visual information, audio information, or tactile information.

According to another embodiment, a smart watch may store history information regarding the direction and distance of movement of the smart watch.

According to another embodiment, a smart watch may perform a function of connecting a link to or disconnecting a link from an external device.

According to a further embodiment, a smart watch may perform a function of transmitting a command regarding the function to an external device.

The disclosure can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), magnetic tapes, floppy disks, and optical data storage devices. The computer-readable recording medium can also be distributed over network coupled computer systems so that the computer-readable code is stored and executed in a distributed fashion.

It will be apparent to those skilled in the art that various modifications and variations can be made in the disclosure without departing from the spirit or scope of the inventions. Thus, it is intended that the disclosure covers the modifications and variations of this invention provided they come within the scope of the appended claims and their equivalents.

In addition, the disclosure describes both a product invention as well as a method invention, and descriptions of both inventions may be complementarily applied as needed.

What is claimed is:

1. A smart watch comprising:
a first sensor unit configured to detect whether the smart watch is worn;
a display unit configured to display visual information;
a second sensor unit configured to detect movement of the smart watch; and
a processor configured to control the first sensor unit, the display unit, and the second sensor unit,
wherein the processor is further configured to:
if a first movement of the smart watch is detected on an arm of a user while the smart watch is being worn, obtain a direction and a distance of the first movement of the smart watch, and
if the direction of the first movement is a first direction and the distance of the first movement is equal to or more than a first threshold distance, perform a first function corresponding to the first direction,
wherein the direction of the first movement is a direction parallel to an axis of the arm of the user and corresponds to an outward direction or an inward direction, and
wherein the distance of the first movement is a distance by which the smart watch moves on the arm of the user and along the axis of the arm.

2. The smart watch according to claim 1, wherein the processor is further configured to:
if a second movement of the smart watch is detected, obtain a direction and a distance of the second movement, and
if the direction of the second movement is the first direction and the distance of the second movement is equal to or more than the first threshold distance, and if the second movement is detected within a first threshold time from when the first movement is detected,
perform a second function related to the first function.

3. The smart watch according to claim 1, wherein the processor is further configured to:
if a second movement of the smart watch is detected, obtain a direction and a distance of the second movement, and
if the direction of the second movement is the first direction and the distance of the second movement is equal to or more than the first threshold distance, and if the second movement is detected after a first threshold time from when the first movement is detected,
perform the first function.

4. The smart watch according to claim 1, wherein the processor is further configured to:
if a second movement of the smart watch is detected, obtain a direction and a distance of the second movement, and
if the direction of the second movement is a direction opposite to the first direction and the distance of the second movement is equal to or more than the first threshold distance, and if the second movement is detected within a first threshold time from when the first movement is detected,
perform a second function related to the first function.

5. The smart watch according to claim 4, wherein the second function related to the first function is a function of returning to a state before the first function is performed.

6. The smart watch according to claim 4, wherein the processor is further configured to, if the second movement is detected within a second threshold time from when the first movement is detected,
perform the first function after the second movement is detected, and
wherein the second threshold time is shorter than the first threshold time.

7. The smart watch according to claim 1, further comprising a rotation sensor unit configured to detect rotation of the smart watch,
wherein the processor is further configured to if the rotation of the smart watch is detected while the smart watch is being worn, obtain a direction and a distance of the rotation of the smart watch, and if the direction of the rotation is along the rotation axis of the smart watch and corresponds to an outward direction or an inward direction, and the distance of the rotation is equal to or more than the second threshold distance, perform a third function.

8. The smart watch according to claim 1, wherein the processor is further configured to, provide a feedback corresponding to the first function.

9. The smart watch according to claim 8, wherein the feedback comprises at least one of a visual feedback, an audio feedback, and a tactile feedback.

10. The smart watch according to claim 1, further comprising a touch sensor unit configured to detect a contact of the user on a front surface of the smart watch.

11. The smart watch according to claim 10, wherein the processor is further configured to, perform the first function corresponding to the first direction only if the contact of the user on the front surface of the smart watch is detected.

12. The smart watch according to claim 1, further comprising a storage configured to store data,
wherein the processor is further configured to:
store history information corresponding to the direction and the distance of the first movement of the smart watch.

13. The smart watch according to claim 12, wherein the processor is further configured to, select and perform one of a plurality of functions as the first function based on the history information.

14. The smart watch according to claim 1, further comprising a communication unit configured to communicate with an external device,
wherein the processor is further configured to transmit a command regarding the first function to the external device.

15. The smart watch according to claim 1, wherein the first function corresponding to the first direction is a function of capturing an image of the visual information displayed on the display unit.

16. The smart watch according to claim 1, wherein the first function corresponding to the first direction is a function of making a call based on a received call signal.

17. The smart watch according to claim 1, wherein the first function corresponding to the first direction is a function of connecting a link to or disconnecting the link from an external device.

18. The smart watch according to claim 1, wherein the first sensor unit and the second sensor unit are included in a single sensor unit.

19. A control method of a smart watch, the method comprising:
   detecting whether the smart watch is worn; and
   detecting a movement of the smart watch,
   wherein the detecting of the movement of the smart watch comprises:
   if a first movement of the smart watch is detected on an arm of a user while the smart watch is being worn, obtaining direction and distance of the first movement of the smart watch; and
   if the direction of the first movement is a first direction and the distance of the first movement is equal to or more than a first threshold distance, performing a first function corresponding to the first direction,
   wherein the direction of the first movement is a direction parallel to an axis of the arm of the user and corresponds to an outward direction or an inward direction, and
   wherein the distance of the first movement is a distance by which the smart watch moves on the arm of the user and along the axis of the arm.

* * * * *